United States Patent
Ionel et al.

(10) Patent No.: US 8,035,273 B2
(45) Date of Patent: Oct. 11, 2011

(54) ROTOR ASSEMBLY HAVING TWO CORE PORTIONS EACH WITH A REDUCED BACK PORTION

(75) Inventors: Dan M. Ionel, Fox Point, WI (US); Stephen J. Dellinger, Houston, OH (US); Robert J. Heideman, Kewaskum, WI (US); Alan E. Lesak, Franklin, WI (US)

(73) Assignee: A.O. Smith Corporation, Milwaukee, WI (US)

( * ) Notice: Subject to any disclaimer, the term of this patent is extended or adjusted under 35 U.S.C. 154(b) by 294 days.

(21) Appl. No.: 11/756,898

(22) Filed: Jun. 1, 2007

(65) Prior Publication Data

US 2007/0222326 A1    Sep. 27, 2007

Related U.S. Application Data

(63) Continuation-in-part of application No. 11/297,217, filed on Dec. 8, 2005, now abandoned.

(51) Int. Cl.
  *H02K 1/22* (2006.01)
  *H02K 1/24* (2006.01)
  *H02K 1/28* (2006.01)
  *H02K 1/30* (2006.01)
  *H02K 21/12* (2006.01)

(52) U.S. Cl. ............ 310/261.1; 310/263; 310/266; 310/156.08; 310/156.09; 310/156.66; 310/156.67; 310/156.68; 310/156.69; 310/156.73; 310/216.001; 310/216.002; 310/216.004; 310/216.066; 310/216.113; 310/216.121; 310/216.123; 310/216.124; 310/178; 310/187

(58) Field of Classification Search ............ 310/156.66, 310/261, 216, 217, 43, 156.08, 156.16, 261.1, 310/263, 266, 156.09, 156.67, 156.68, 156.69, 156.73, 216.001, 216.002, 216.004, 216.066, 216.113, 216.121, 216.123, 216.124, 178, 187; *H02K 21/12, 1/22, 1/24, 1/28, 1/30*
See application file for complete search history.

(56) References Cited

U.S. PATENT DOCUMENTS 508,634 A * 11/1893 Priest .................... 310/264
(Continued)

FOREIGN PATENT DOCUMENTS

GB           166156 A           7/1921
(Continued)

OTHER PUBLICATIONS

Definition of "sealed" from Dictionary.com Unabridged. Random House, Inc. Sep. 8, 2010. <Dictionary.com http://dictionary.reference.com/browse/sealed>.*

*Primary Examiner* — Quyen Leung
*Assistant Examiner* — Michael Andrews
(74) *Attorney, Agent, or Firm* — Michael Best & Friedrich LLP

(57) ABSTRACT

A rotor for an electric machine having a number of poles includes a shaft that extends along a portion of an axis and defines an outer surface. A first core portion is formed as a single inseparable component and includes a first portion that extends from the outer surface to a first outside diameter to define a first thickness, and a second portion spaced axially from the first portion that includes a reduced back portion that extends from an inside diameter to the first outside diameter to define a second thickness that is less than the first thickness. A second core portion is connected to the first core portion and includes a second outside diameter that is substantially the same as the first outside diameter.

22 Claims, 27 Drawing Sheets

U.S. PATENT DOCUMENTS

| | | | |
|---|---|---|---|
| 729,655 A * | 6/1903 | Parsons | 310/261 |
| 2,086,398 A * | 7/1937 | Tognola | 310/156.63 |
| 2,212,192 A * | 8/1940 | Howell | 310/156.66 |
| 2,317,187 A * | 4/1943 | Griffiths | 310/156.66 |
| 2,334,157 A * | 11/1943 | Morath | 310/156.66 |
| 2,579,318 A * | 12/1951 | Hershberger | 310/156.66 |
| 2,651,733 A * | 9/1953 | Stark | 310/111 |
| 2,767,339 A | 10/1956 | Hatfield | |
| 2,802,959 A * | 8/1957 | Powers | 310/156.66 |
| 2,922,903 A * | 1/1960 | Knudson | 310/156.66 |
| 3,058,019 A * | 10/1962 | Eisler | 310/164 |
| 3,088,044 A * | 4/1963 | Goss et al. | 310/162 |
| 3,164,735 A * | 1/1965 | Lichowsky | 310/156.03 |
| 3,303,369 A * | 2/1967 | Erickson | 310/168 |
| 3,427,485 A * | 2/1969 | Dotto | 310/164 |
| 3,428,840 A | 2/1969 | Kober | |
| 3,448,308 A * | 6/1969 | Peterson et al. | 310/41 |
| 3,496,393 A * | 2/1970 | Reifman et al. | 310/49 R |
| 3,657,582 A | 4/1972 | Phelon | |
| 3,790,834 A * | 2/1974 | Tanaka | 310/162 |
| 3,872,334 A * | 3/1975 | Loubier | 310/43 |
| 3,967,147 A * | 6/1976 | Preiser et al. | 310/162 |
| 4,023,057 A * | 5/1977 | Meckling | 310/154.07 |
| 4,114,057 A * | 9/1978 | Esters | 310/46 |
| 4,263,711 A | 4/1981 | Sakano et al. | |
| 4,354,126 A * | 10/1982 | Yates | 310/156.59 |
| 4,388,545 A * | 6/1983 | Honsinger et al. | 310/156.66 |
| 4,427,911 A | 1/1984 | Manson | |
| 4,433,260 A | 2/1984 | Weisbord et al. | |
| 4,472,650 A * | 9/1984 | Advolotkin et al. | 310/156.16 |
| 4,484,094 A * | 11/1984 | Ade et al. | 310/43 |
| 4,618,792 A * | 10/1986 | Yates | 310/156.55 |
| 4,672,247 A | 6/1987 | Madsen et al. | |
| 4,757,603 A * | 7/1988 | Stokes | 310/156.13 |
| 4,801,834 A | 1/1989 | Stokes | |
| 4,823,040 A | 4/1989 | Oudet | |
| 4,959,577 A * | 9/1990 | Radomski | 310/263 |
| 4,973,872 A | 11/1990 | Dohogne | |
| 4,977,344 A | 12/1990 | Obradovic | |
| 4,980,595 A * | 12/1990 | Arora | 310/263 |
| 5,016,340 A * | 5/1991 | Kato | 29/598 |
| 5,023,502 A * | 6/1991 | Johnson | 310/261 |
| 5,027,026 A | 6/1991 | Mineta et al. | |
| 5,111,094 A * | 5/1992 | Patel et al. | 310/156.22 |
| 5,130,595 A * | 7/1992 | Arora | 310/268 |
| 5,220,233 A | 6/1993 | Birch et al. | |
| 5,270,604 A * | 12/1993 | Sandel et al. | 310/263 |
| 5,306,123 A * | 4/1994 | Day et al. | 310/51 |
| 5,386,161 A * | 1/1995 | Sakamoto | 310/49 R |
| 5,497,544 A | 3/1996 | Bien et al. | |
| 5,500,994 A * | 3/1996 | Itaya | 310/156.13 |
| 5,552,651 A * | 9/1996 | Radomski | 310/181 |
| 5,604,388 A * | 2/1997 | Baker et al. | 310/51 |
| 5,684,352 A * | 11/1997 | Mita et al. | 310/156.56 |
| 5,704,111 A * | 1/1998 | Johnson et al. | 29/598 |
| 5,767,607 A * | 6/1998 | Kieffer | 310/261 |
| 5,828,152 A * | 10/1998 | Takeda et al. | 310/156.19 |
| 5,892,313 A * | 4/1999 | Harris et al. | 310/263 |
| 5,937,930 A * | 8/1999 | Nakamura et al. | 164/112 |
| 5,964,028 A | 10/1999 | Buse | |
| 5,998,902 A * | 12/1999 | Sleder et al. | 310/153 |
| 6,002,190 A | 12/1999 | Kieffer | |
| 6,025,667 A * | 2/2000 | Narita et al. | 310/156.53 |
| 6,066,906 A * | 5/2000 | Kalsi | 310/179 |
| 6,144,131 A | 11/2000 | Hollenbeck et al. | |
| 6,144,138 A * | 11/2000 | Ragaly | 310/263 |
| 6,172,441 B1 * | 1/2001 | York et al. | 310/263 |
| 6,199,265 B1 | 3/2001 | Itou et al. | |
| 6,218,749 B1 * | 4/2001 | Nondahl et al. | 310/68 C |
| 6,225,727 B1 * | 5/2001 | Oohashi et al. | 310/263 |
| 6,252,329 B1 | 6/2001 | Del Fabbro | |
| 6,291,920 B1 * | 9/2001 | Miller et al. | 310/261 |
| 6,359,366 B1 * | 3/2002 | Liang et al. | 310/263 |
| 6,396,181 B1 * | 5/2002 | Akemakou | 310/156.01 |
| 6,408,502 B1 * | 6/2002 | Brahmavar et al. | 29/596 |
| 6,417,596 B1 * | 7/2002 | Schurter et al. | 310/261 |
| 6,437,477 B1 * | 8/2002 | Krefta et al. | 310/263 |
| 6,455,978 B1 * | 9/2002 | Krefta et al. | 310/263 |
| 6,531,801 B1 * | 3/2003 | Blazek et al. | 310/261 |
| 6,608,424 B2 * | 8/2003 | Kusase | 310/263 |
| 6,621,190 B1 * | 9/2003 | Asao et al. | 310/263 |
| 6,700,296 B1 * | 3/2004 | Oohashi et al. | 310/263 |
| 6,707,226 B2 * | 3/2004 | Umeda | 310/263 |
| 6,800,970 B2 * | 10/2004 | Aoshima | 310/49 R |
| 6,853,111 B2 * | 2/2005 | Umeda et al. | 310/263 |
| 6,870,295 B2 * | 3/2005 | Lim et al. | 310/216 |
| 6,882,081 B2 * | 4/2005 | Isoda et al. | 310/263 |
| 6,889,419 B2 * | 5/2005 | Reiter et al. | 310/156.43 |
| 6,892,439 B1 * | 5/2005 | Neal et al. | 310/43 |
| 6,927,526 B2 * | 8/2005 | Ishii et al. | 310/261 |
| 6,930,422 B2 * | 8/2005 | Rose | 310/156.32 |
| 6,933,640 B2 * | 8/2005 | Schurter et al. | 310/85 |
| 6,936,946 B2 * | 8/2005 | Maeda et al. | 310/156.66 |
| 7,143,503 B2 * | 12/2006 | Ionel et al. | 310/156.47 |
| 7,157,827 B2 * | 1/2007 | Heideman et al. | 310/217 |
| 7,307,366 B2 * | 12/2007 | Ionel et al. | 310/156.47 |
| 7,332,845 B2 * | 2/2008 | Heideman et al. | 310/217 |
| 7,348,706 B2 * | 3/2008 | Ionel et al. | 310/216 |
| 7,378,767 B2 * | 5/2008 | Kusumoto et al. | 310/68 D |
| 2002/0005673 A1 * | 1/2002 | Umeda et al. | 310/156.11 |
| 2002/0011757 A1 * | 1/2002 | Tanaka et al. | 310/263 |
| 2002/0047448 A1 * | 4/2002 | Kawamura | 310/190 |
| 2002/0125787 A1 * | 9/2002 | Howard et al. | 310/254 |
| 2002/0135263 A1 | 9/2002 | Neal | |
| 2002/0153783 A1 * | 10/2002 | Lau | 310/43 |
| 2003/0062801 A1 * | 4/2003 | Aoshima | 310/261 |
| 2003/0102758 A1 * | 6/2003 | Kusase et al. | 310/156.66 |
| 2004/0046474 A1 * | 3/2004 | Kalsi | 310/179 |
| 2004/0103521 A1 * | 6/2004 | Reiter et al. | 310/156.43 |
| 2004/0124737 A1 * | 7/2004 | Yamamoto et al. | 310/269 |
| 2004/0155550 A1 * | 8/2004 | Yamamoto et al. | 310/194 |
| 2005/0062348 A1 * | 3/2005 | Ohnishi et al. | 310/49 R |
| 2005/0082921 A1 * | 4/2005 | Schurter et al. | 310/58 |
| 2005/0144774 A1 * | 7/2005 | Ionel et al. | 310/156.47 |
| 2005/0258705 A1 * | 11/2005 | Berwald et al. | 310/216 |
| 2005/0269894 A1 * | 12/2005 | Yamamoto et al. | 310/216 |
| 2006/0028087 A1 * | 2/2006 | Ionel et al. | 310/218 |
| 2006/0061227 A1 * | 3/2006 | Heideman et al. | 310/156.56 |
| 2006/0066158 A1 * | 3/2006 | Pizzichil | 310/54 |
| 2006/0103251 A1 * | 5/2006 | Taniguchi et al. | 310/156.01 |
| 2007/0085437 A1 * | 4/2007 | Heideman et al. | 310/156.59 |
| 2007/0132335 A1 * | 6/2007 | Ionel et al. | 310/261 |
| 2007/0132336 A1 * | 6/2007 | Ionel et al. | 310/261 |
| 2007/0222326 A1 * | 9/2007 | Ionel et al. | 310/216 |
| 2007/0247015 A1 * | 10/2007 | Dellinger | 310/217 |
| 2008/0136272 A1 * | 6/2008 | Ishikawa et al. | 310/58 |

FOREIGN PATENT DOCUMENTS

JP          3032333          2/1991

* cited by examiner

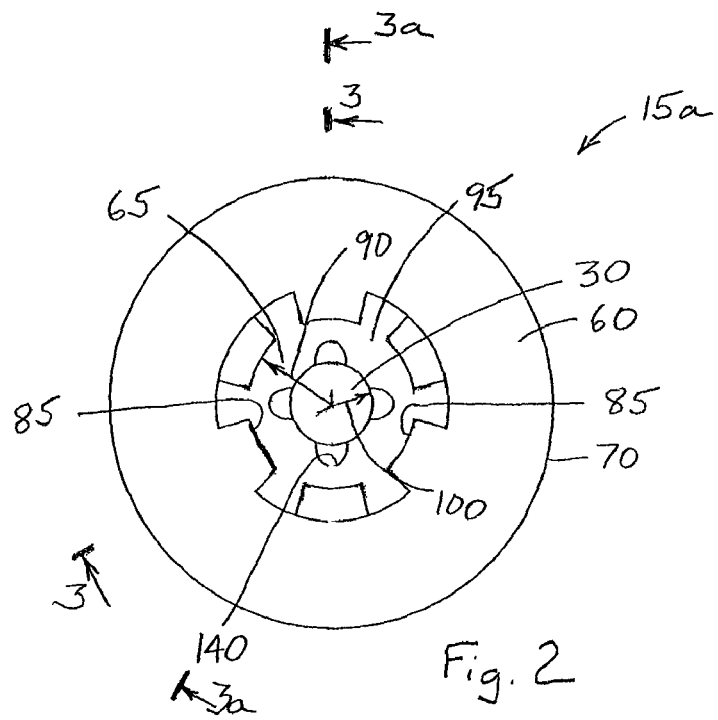
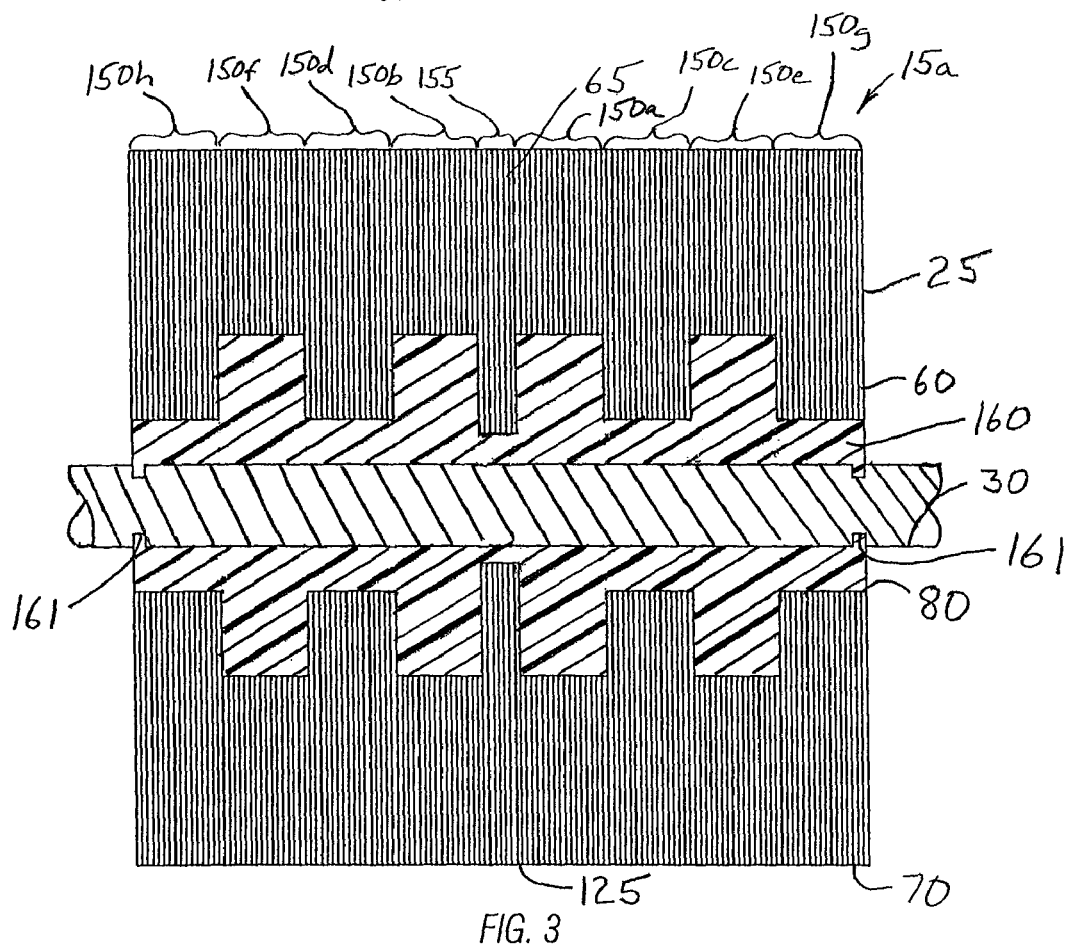

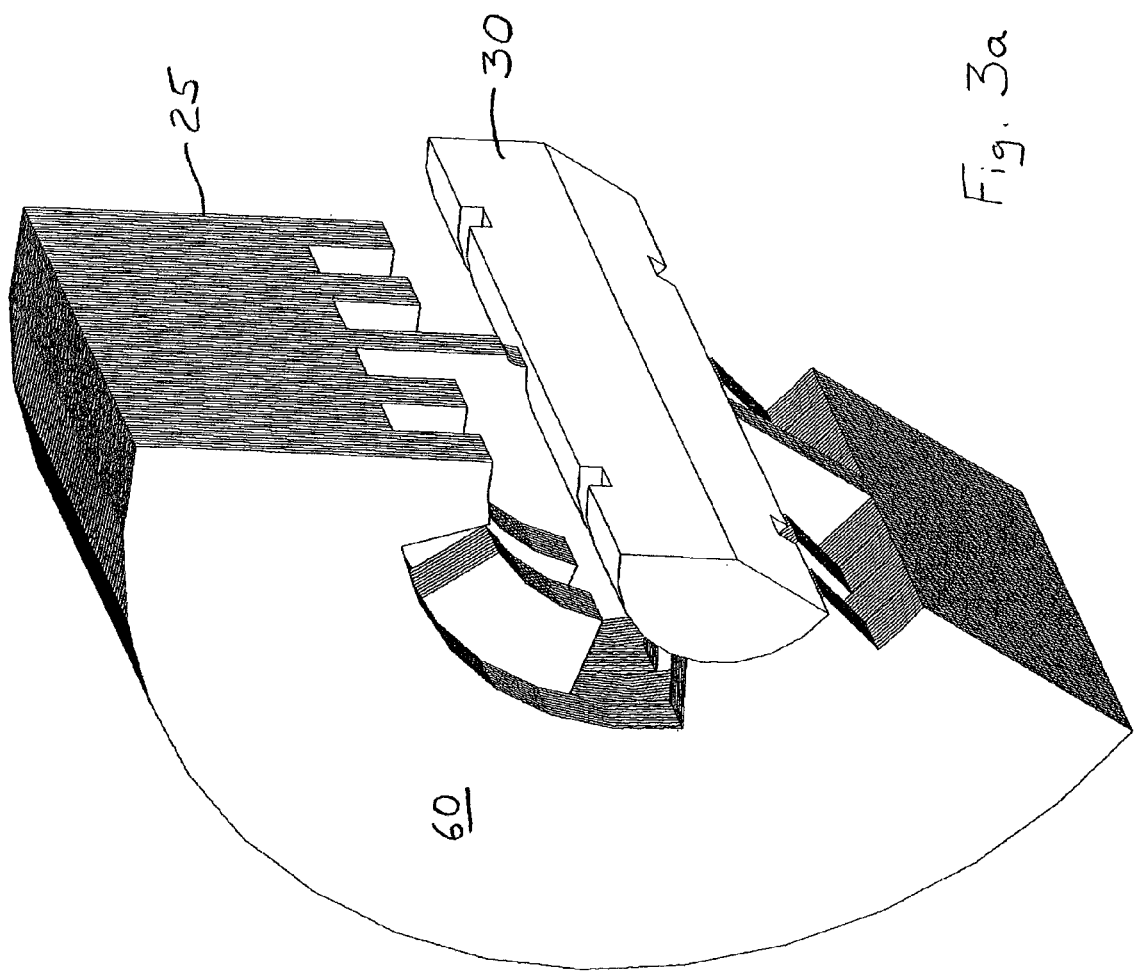

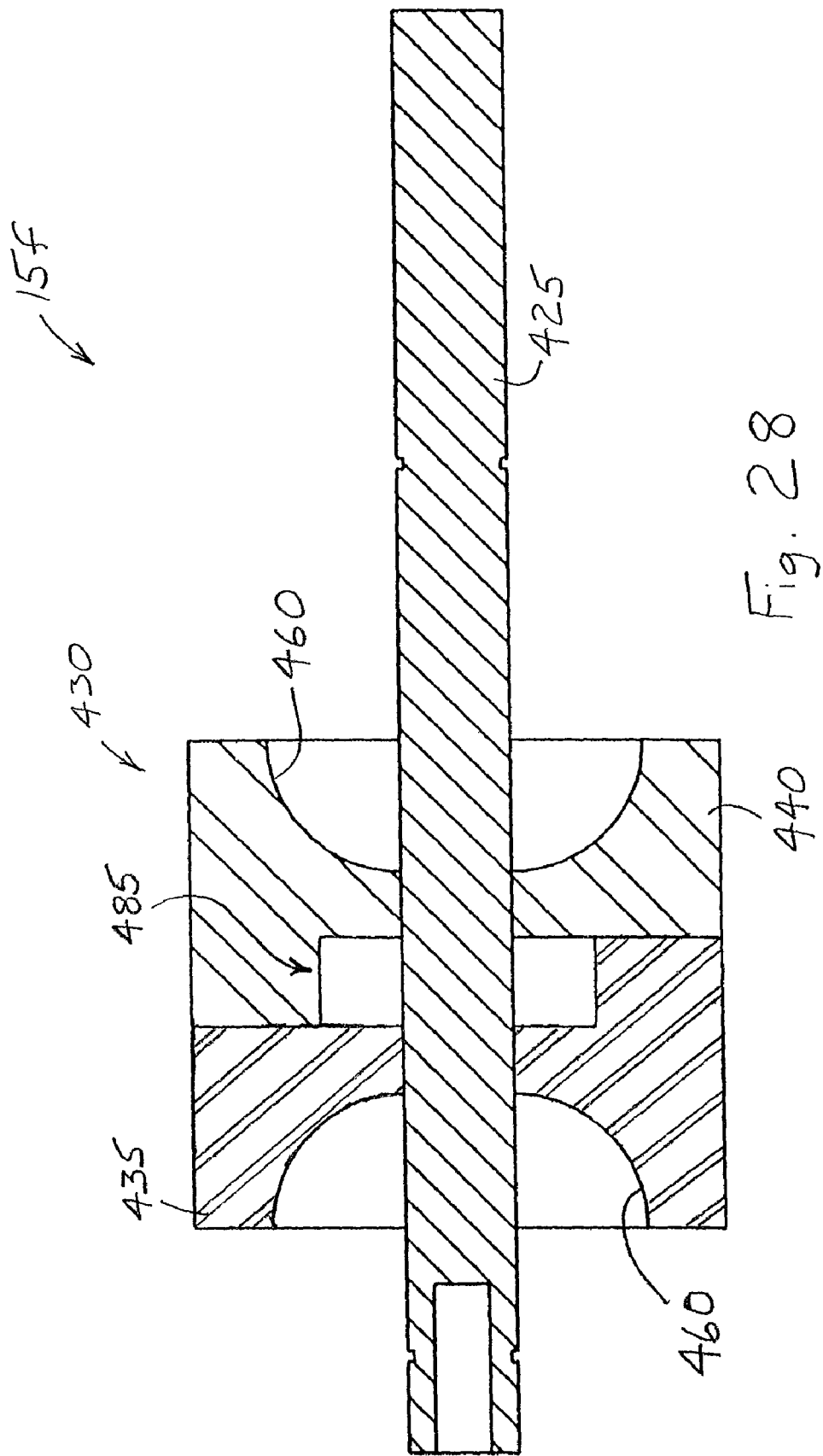

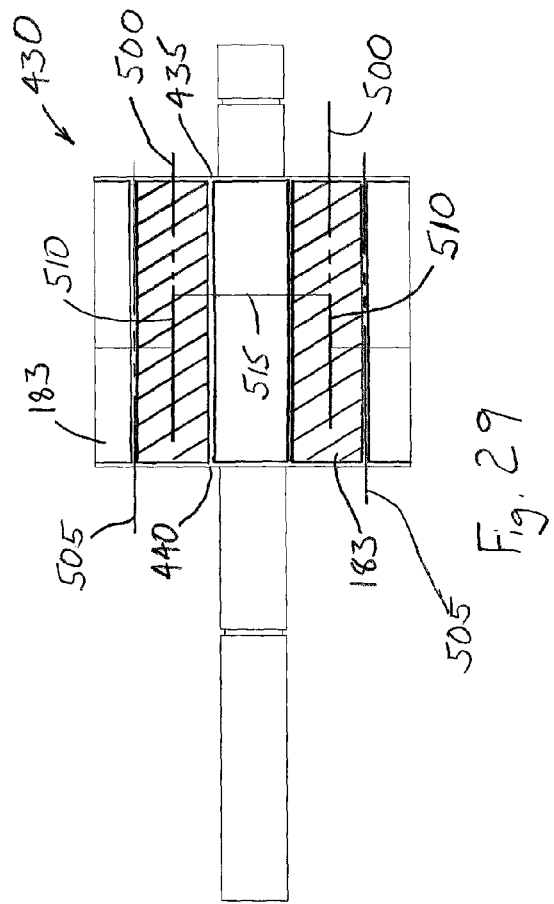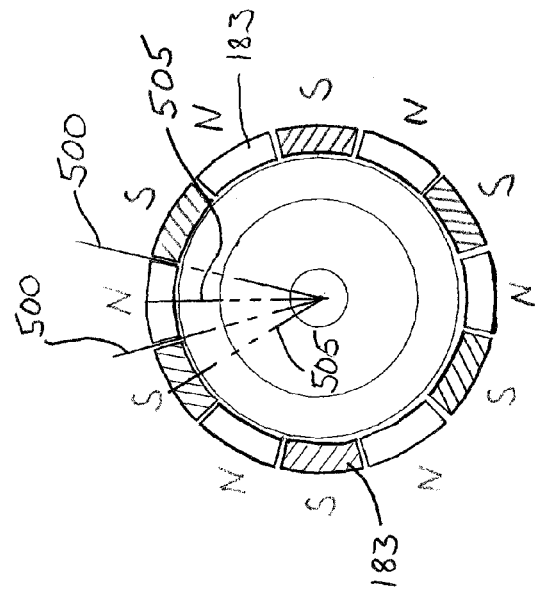

ROTOR ASSEMBLY HAVING TWO CORE PORTIONS EACH WITH A REDUCED BACK PORTION

RELATED APPLICATION DATA

The present application is a continuation-in-part of U.S. patent application Ser. No. 11/297,217 filed Dec. 8, 2005, and entitled "Rotor Assembly Having a Reduced Back Portion and a Method of Manufacturing Same," the entire contents of which are fully incorporated herein by reference.

BACKGROUND

The invention relates to a rotor assembly for an electric machine and a method of manufacturing the same. More specifically, the invention relates to a rotor having a reduced yoke or back portion.

SUMMARY

In one embodiment, the invention provides a rotor for an electric machine having a number of poles. The rotor includes a shaft that extends along a portion of an axis and defines an outer surface. A first core portion is formed as a single inseparable component and includes a first portion that extends from the outer surface to a first outside diameter to define a first thickness, and a second portion spaced axially from the first portion that includes a reduced back portion that extends from an inside diameter to the first outside diameter to define a second thickness that is less than the first thickness. A second core portion is connected to the first core portion and includes a second outside diameter that is substantially the same as the first outside diameter.

In another embodiment, the invention provides a rotor for an electric machine having a number of poles. The rotor includes a shaft that extends along a portion of an axis and defines an outer surface. A powdered metal core extends along a portion of the axis to define a core length. The powdered metal core includes a first portion that extends from the outer surface to an outside diameter to define a first thickness, and a second portion spaced axially from the first portion and including a reduced back portion that extends from the outside diameter to an inside diameter to define a second thickness that is less than the first thickness.

In yet another construction, the invention provides a rotor for an electric machine having a number of poles. The rotor includes a shaft that extends along a portion of an axis and defines an outer surface. A core is formed as a single inseparable component and extends along a portion of the axis to define a core length. The core includes a first portion that extends along a portion of the core length and is in direct contact with the shaft and extends from the shaft to the outside diameter to define a first thickness, and a second portion that extends along the remainder of the core length and defines a reduced back portion that extends from the outside diameter to an inside diameter to define a second thickness that is less than the first thickness.

Other aspects and embodiments of the invention will become apparent by consideration of the detailed description and accompanying drawings.

BRIEF DESCRIPTION OF THE DRAWINGS

The detailed description particularly refers to the accompanying figures in which:

FIG. 2 is an end view of a rotor core and shaft subassembly suitable for use with the motor of FIG. 1;

FIG. 3 is a section view of the rotor core and shaft subassembly of FIG. 2 taken along line 3-3 of FIG. 2;

FIG. 3a is a perspective view of a partial section of the rotor core and shaft subassembly of FIG. 2 taken along line 3a-3a of FIG. 2;

FIG. 28 is a sectional view of the rotor core and shaft subassembly of FIG. 25 taken along line 28-28 of FIG. 25;

FIG. 29 is top view of the rotor core of FIG. 25 showing a first magnet arrangement;

FIG. 30 is an end view of the rotor core of FIG. 25 showing the first magnet arrangement of FIG. 29;

DETAILED DESCRIPTION

Before any embodiments of the invention are explained in detail, it is to be understood that the invention is not limited in its application to the details of construction and the arrangement of components set forth in the following description or illustrated in the following figures. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected,". "supported," and "coupled" and variations thereof are used broadly and encompass direct and indirect mountings, connections, supports, and couplings. Further, "connected" and "coupled" are not restricted to physical or mechanical connections or couplings. In addition, where a method, process, or listing of steps is provided, the order in which the method, process, or listing of steps is presented should not be read as limiting the invention in any way.

Figure 1:
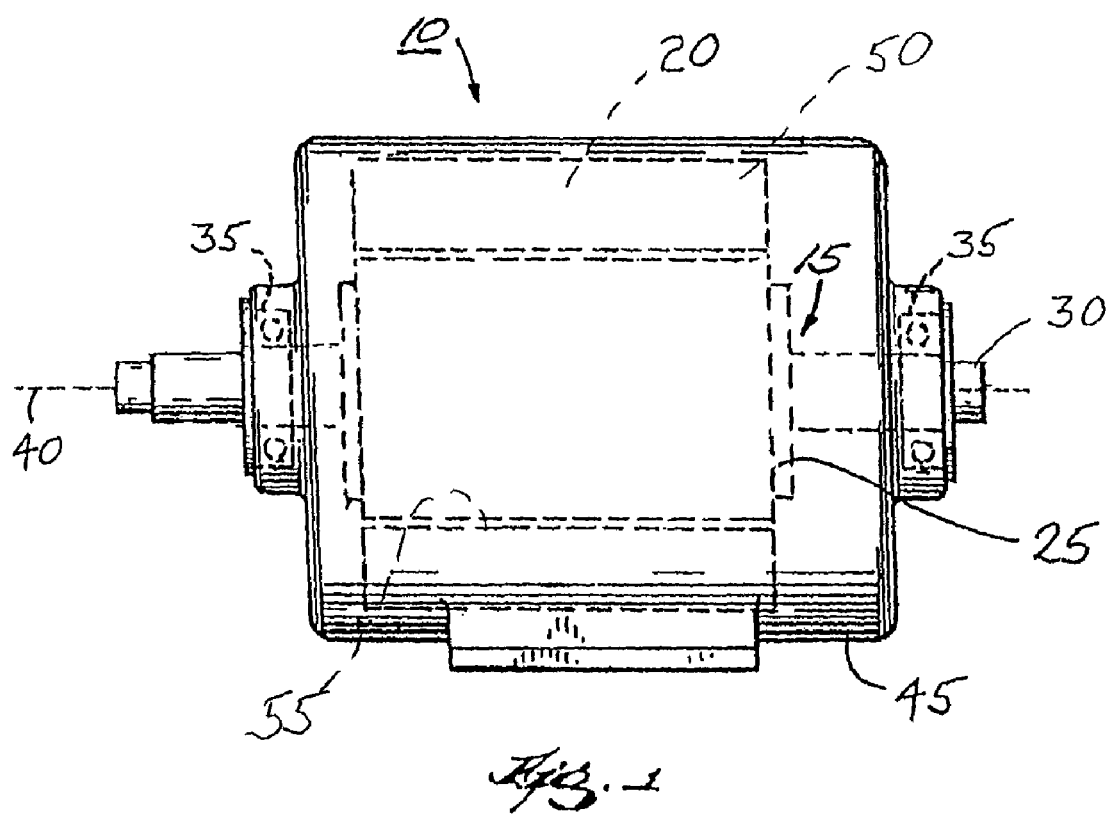
FIG. 1 is a schematic side view of a motor including a rotor.

As schematically illustrated in FIG. 1, a motor 10 generally includes a rotor 15 disposed within a stator 20. The rotor 15 includes a rotor core 25 and a shaft 30 that extends from one or both ends of the rotor core 25 to provide support points and to provide a convenient shaft power take off point. Generally, two or more bearings 35 engage the rotor shaft 30 and support the rotor 15 such that it rotates about a rotational axis 40. The stator 20 generally includes a housing 45 that supports a stator core 50. The stator core 50 defines a substantially cylindrical aperture 55 that is centered on the rotational axis 40. When the rotor 15 is in its operating position relative to the stator 20, the rotor core 25 is generally centered within the aperture 55 such that a small air gap is established between the rotor core 25 and the stator core 50. The air gap allows for relatively free rotation of the rotor 15 within the stator 20.

The motor 10 illustrated in FIG. 1 is a permanent magnet brushless motor. As such, the rotor 15 includes permanent magnets (not shown) that define two or more magnetic poles. The stator 20 includes windings that can be selectively energized to produce a varying magnetic field. The permanent magnets of the rotor 15 interact with the magnetic field of the stator 20 to produce rotor rotation. As one of ordinary skill will realize, the present invention is well suited to many types of motors (e.g. induction motors), in addition to the permanent magnet brushless motors 10 illustrated herein. As such, the invention should not be limited to only these types of motors. Furthermore, one of ordinary skill will realize that the present invention can also be applied to many types of generators. In addition, figures and description presented herein are directed to a rotor 15 and/or a motor 10. However, some of the features described and illustrated could be applied to stators. Thus, while the figures and description refer to a brushless motor 10 and/or a rotor 15, other applications are possible.

Figure 4:
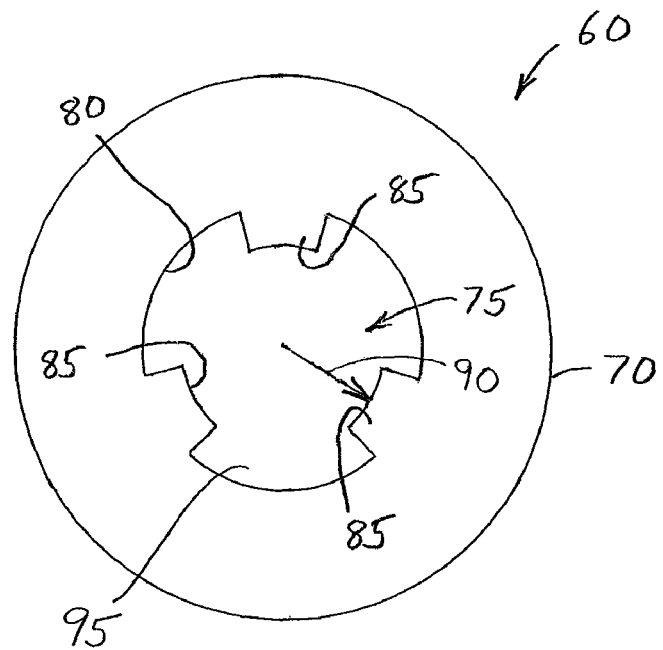
FIG. 4 is an end view of a first lamination suitable for use in forming the rotor core of FIG. 2.

In many constructions, the rotor core 25 is formed by stacking a plurality of laminations and attaching permanent magnets to the stacked laminations. The magnets 183 (shown in FIGS. 8 and 9) can be, for example, mounted on the rotor surface facing the air-gap or inserted in the interior of the rotor core. Generally, the laminations are punched or cut from electrical grade steel as is known in the art. The laminations, once stacked, are positioned over the shaft 30 to complete the rotor 15. A rotor core and shaft subassembly 15a, illustrated in FIG. 2, includes a plurality of first laminations 60 and a plurality of second laminations 65 stacked on top of one another. The first lamination 60, shown in FIG. 4, includes a generally circular outer surface 70 and a central aperture 75 that cooperates with adjacent laminations 60 to define an inner surface 80. Three teeth or tangs 85 extend radially inward from the inner surface 80 to a tooth diameter 90 that is large enough to receive the shaft 30 and define a space 95 therebetween. In other words, the tooth diameter 90 is larger than a shaft diameter 100 in the area where the laminations 60 will eventually be positioned.

In the illustrated construction, the three tangs 85 are evenly positioned approximately 120 degrees from one another. Of course, other constructions may include unevenly spaced tangs 85, or more than three tangs 85 that are evenly or unevenly spaced. For example, another construction may include five tangs 85 that are spaced approximately 72 degrees apart. As one of ordinary skill in the art will realize, many different shapes, quantities and combinations of tangs 85 are possible.

Figure 6:
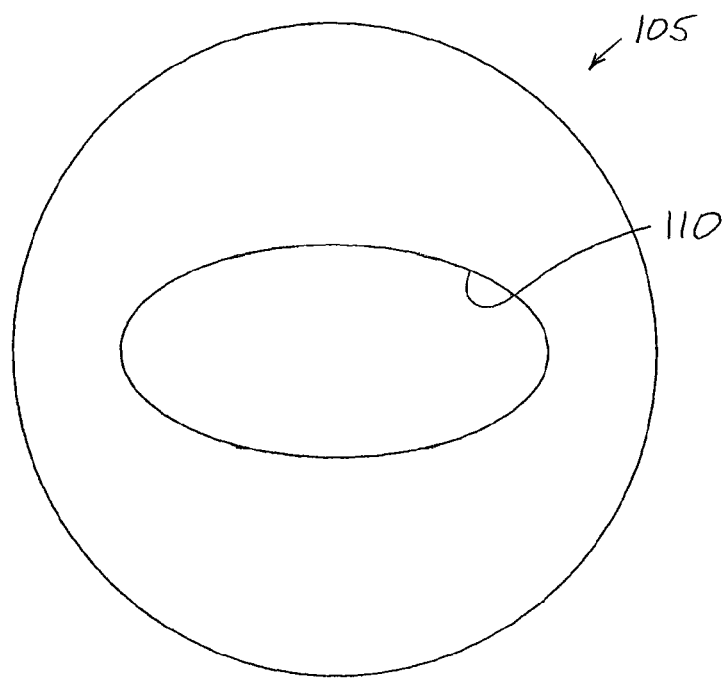
FIG. 6 is an end view of another lamination suitable for use in forming the rotor of FIG. 2.
Figure 7:
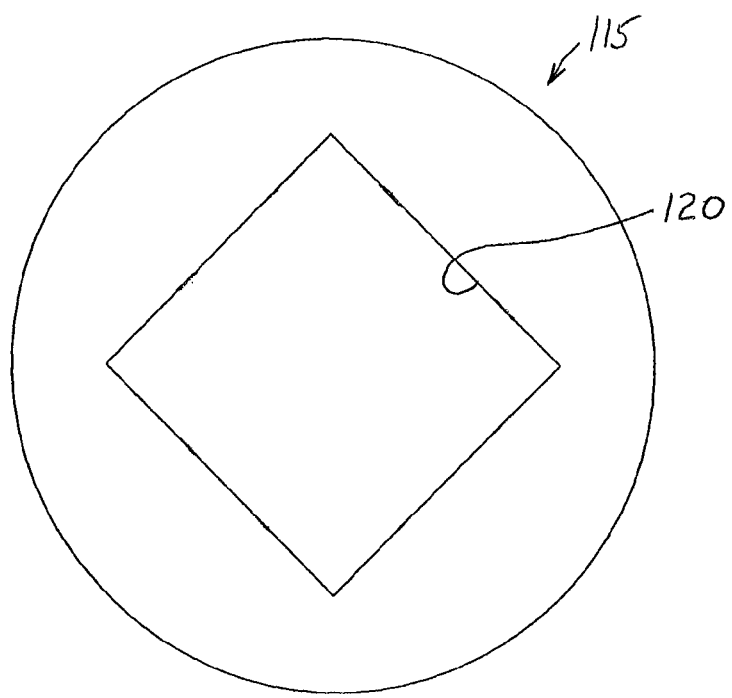
FIG. 7 is an end view of yet another lamination suitable for use in forming the rotor of FIG. 2.

Still other constructions may employ first laminations 60 that do not include tangs 85 but rather include a non-circular aperture. For example, FIG. 6 illustrates a lamination 105 that includes an elliptical central aperture 110. Because the aperture 110 is not axisymetric, laminations 105 can be rotated relative to one another and stacked to position a portion of one lamination 105 over a portion of the aperture 110 of another lamination 105. FIG. 7 illustrates yet another arrangement in which a lamination 115 includes a square central aperture 120. Again, because the square aperture 120 is not axisymetric, one lamination 115 can be rotated with respect to another lamination 115 to position a portion of the lamination 115 over a portion of the aperture 120 of the adjacent lamination 115.

Figure 5:
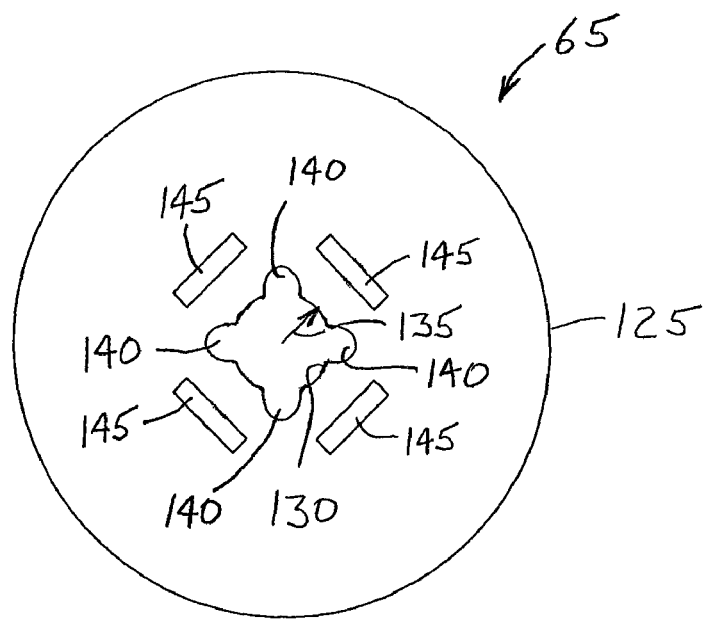
FIG. 5 is an end view of a second lamination suitable for use in forming the rotor of FIG. 2.

Each of the second laminations 65, shown in FIG. 5, includes an outer surface 125 that defines a substantially circular profile. In preferred constructions, the outer surface 70 of the first laminations 60 and the outer surface 125 of the second laminations 65 are similarly sized. The second laminations 65 also define a central aperture 130 that has a diameter 135 that is substantially the same as the shaft diameter 100. As such, the second laminations 65 fit snugly against the shaft 35 when the rotor core and shaft subassembly 15a is assembled. Several recesses 140 extend radially outward from the central aperture 130 to provide clearance space between the shaft 35 and the laminations 65. In the illustrated construction, four elliptical recesses 140 are equally spaced (i.e., 90 degrees apart) from one another. As one of ordinary skill will realize, other shaped recesses 140 or a different number of recesses 140 may be employed if desired. In addition, the recesses 140 may be unevenly spaced if desired.

Each of the second laminations 65 may include apertures 145 positioned outward of the recesses 140. The construction illustrated in FIG. 5 includes four rectangular apertures 145 that are spaced apart from one another by about 90 degrees. The apertures 145 are also rotated with respect to the elliptical recesses 140 by about 45 degrees such that the rectangular apertures 145 are positioned between the elliptical recesses 140. In other constructions, other shaped or other numbers of apertures 145 may be employed. In some constructions, the apertures 145 may be differently positioned or omitted.

Before proceeding, it should be noted that laminations of the type described herein often include alignment members such as indentations, lances, or apertures that facilitate the axial alignment of the various laminations. In some constructions, the alignment members are formed during the punching process that forms the lamination. The alignment members generally define an indentation on one side of the lamination and a protrusion on the opposite side of the lamination. The protrusions of one alignment member fit within the indentations of an adjacent lamination to align and fasten the laminations as desired.

The rotor core and shaft subassembly 15a of FIGS. 2, 3, and 3a includes several main core portions 150 each formed by stacking several of the first laminations 60 on top of one another and an alignment core portion 155 formed by stacking a plurality of second laminations 65. The laminations 60, 65 may be bonded to one another or may be stacked without bonding. In the construction illustrated in FIG. 3, eight main core portions 150 are formed in substantially the same way and are attached to one another to at least partially define the rotor core and shaft subassembly 15a. The alignment core portion 155 is positioned with four main core portions 150 on either side to complete the rotor core and shaft subassembly 15a. In the construction of FIG. 3, only a single alignment core portion 155 is employed, with other constructions using two or more alignment core portions 155.

A first main core portion 150a is positioned adjacent the alignment core portion 155 on a first side of the rotor core and shaft subassembly 15a and a second main core portion 150b is positioned adjacent the alignment core portion 155 on a second side of the rotor core and shaft subassembly 15a. In the construction illustrated in FIG. 3, the first and second main core portions 150a, 150b are positioned to have the same radial alignment with respect to one another. In other words, when viewed from the end, as in FIG. 2, the tangs 85 of the first and second main core portions 150a, 150b align with one another.

A third main core portion 150c is positioned adjacent the first main core portion 150a and a fourth main core portion 150d is positioned adjacent the second core portion 150b. In preferred constructions, the third and fourth main core portions 150c, 150d align with one another, but are rotated with respect to the first and second main core portions 150a, 150b. As illustrated in FIGS. 2 and 3a, the third and fourth main core portions 150c, 150d are rotated about 60 degrees with respect to the first and second core portions 150a, 150b.

The described process continues with a fifth main core portion 150e positioned adjacent the third main core portion 150c and aligned with the first main core portion 150a. Similarly, a sixth main core portion 150f is positioned adjacent the fourth main core portion 150d and aligned with the second main core portion 150b. A seventh main core portion 150g is positioned adjacent the fifth main core portion 150e and aligned with the third main core portion 150c. Similarly, an eighth main core portion 150h is positioned adjacent the sixth main core portion 150f and aligned with the fourth main core portion 150d. In the preferred constructions, the rotor core is manufactured by aligning and bonding the main and alignment core portions and then the core is fitted to the shaft. In preferred constructions, a very close fit, such as interference or shrink fit exists between the alignment core portion 155 and the shaft 30. The procedure described ensures that all the core sections are concentric with the shaft. Furthermore, this procedure produces a castellated (staggered) structure of the core 15a and the space 95 around the shaft. Before proceeding, it should be noted that other arrangements are possible and are contemplated by the present invention. For example, other arrangements may vary the alignment of each core portion 150 rather than aligning every other core portion 150.

In addition, other rotors may include additional, or fewer, main core portions 150 or may include additional alignment core portions 155.

The shaft 30, eight main core portions 150a-150h, and one alignment core portion 155 are then positioned within a mold such that a resilient material 160 such as plastic can be injection molded. The plastic 160 fills the spaces 95 between the main core portions 150a-150h and the shaft 30 and also fills the space 95 between the shaft 30 and the alignment core portion 155 defined by the recesses 140. In constructions that employ apertures 145 in the second laminations 65, plastic also fills these apertures 145. The plastic 160 serves to connect the various core portions 150, 155 to the shaft 30 for rotation in unison, while simultaneously providing a damping member. The plastic 160 also locks the axial position of the core portions 150, 155 on the shaft 30. The castellated structure of the space 95 enhances the coupling between the core 15a, the shaft 30 and the plastic 160. Furthermore, undercuts 161 made into the shaft (see FIG. 3) and/or knurling of the shaft surface enhances the coupling between the shaft 30 and the plastic 160. During motor operation, some torque variations that would be transmitted through a more solid connection are dampened by the plastic connection. In other constructions, other materials are employed rather than plastic. For example, synthetic rubber or another injectable material may be used in place of plastic. The recesses 140 and the apertures 145, when present, allow the plastic to flow axially during the injection molding from one end to another enhancing the manufacturability of the rotor.

Figure 8:
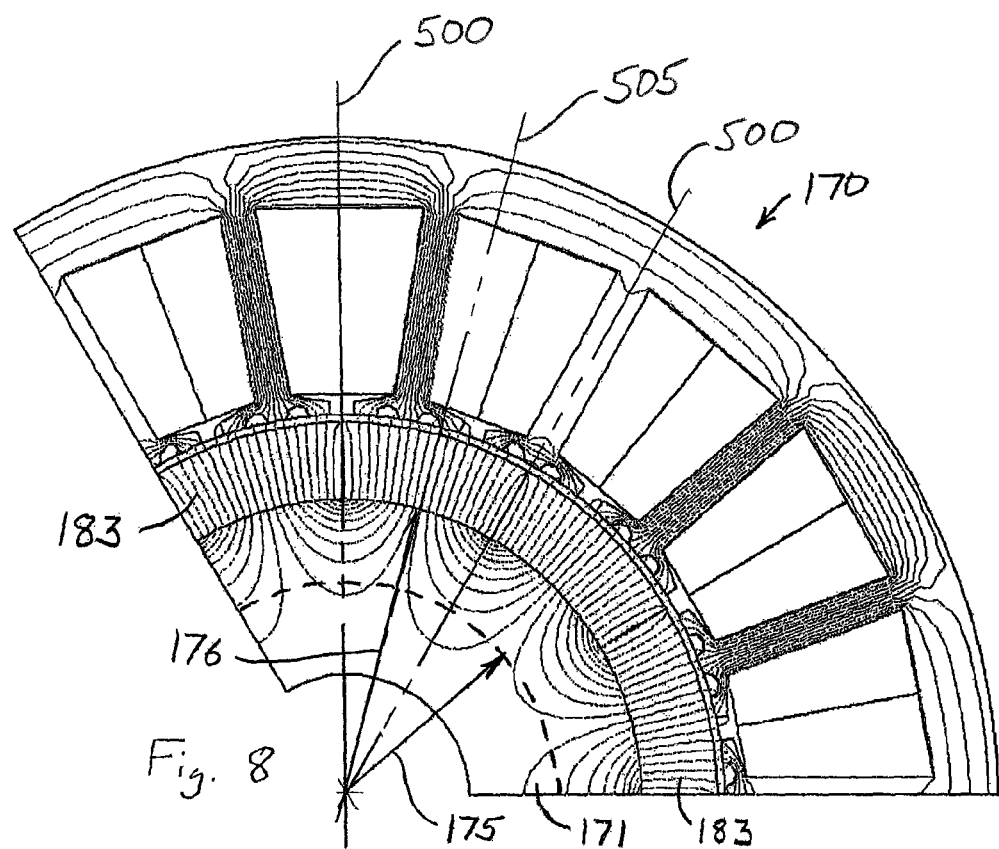
FIG. 8 is a cross-sectional view of a portion of a brushless permanent magnet (PM) motor illustrating the magnetic flux lines within a prior-art rotor.
Figure 9:
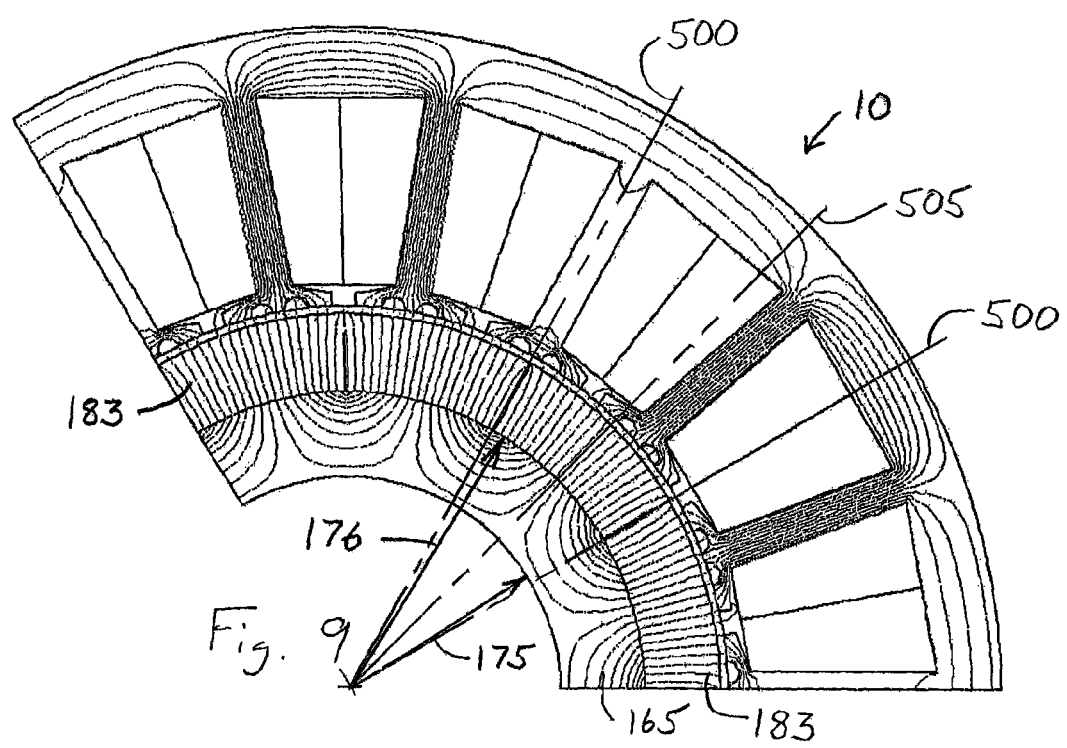
FIG. 9 is a cross-sectional view of a portion of a brushless permanent magnet (PM) motor illustrating the magnetic flux lines within a rotor having reduced back iron.

It is important to note that the main core portions 150a-150h include a back iron portion 165 that extends only part way to the shaft 30, as also illustrated in FIG. 9. As such, a portion of the back iron 165, that in more traditional rotor constructions would be part of the magnetic circuit (see FIG. 8), is eliminated in the present construction and replaced with resilient material 160. FIG. 8 illustrates the magnetic flux lines in a motor 170 that includes a rotor back iron portion 171 that extends to the shaft 30 or nearly to the shaft 30. As can be seen, very little magnetic flux crosses a surface of a radius 175. FIG. 9 illustrates the magnetic flux in a rotor portion (e.g. the main core portions 150a-150h) that extends only to the aforementioned radius 175. As can be seen, the magnetic flux in the back iron portion 165 is compressed slightly. However, this effect is minor and has a very small effect on the motor's overall performance. The minimum back iron radial thickness, defined as the difference between the radius at the base of the magnet (RBM) 176 and the radius 175 is calculated from the following equation and has been verified using the finite element method (as shown in FIGS. 8 and 9).

Minimum Back Iron Radial Thickness=$RBM*PI/(\#Poles)$

In practice, a preferred range equal to 75 percent to 125 percent of the above value can be employed, with more preferred ranges being less than or equal to 100 percent of the calculated value.

The aforementioned equation can be used to design a rotor core having an optimal rotor yoke (back iron) radial thickness, dependent of the number of magnetic poles (# Poles). In a rotor construction with the magnets mounted on the rotor surface RBM 176 is defined as shown in FIGS. 8-9. In a rotor construction with the magnets inserted in the rotor and radially magnetized, commonly referred as an interior permanent magnet (IPM) rotor, RBM is defined as the minimum radius measured from the motor center to the face of a magnet. In a squirrel cage rotor, RBM is defined as the minimum radius measured from the motor center to a rotor bar. Throughout the text, twice the value of RBM is also referred as the "outside diameter".

Figure 10:
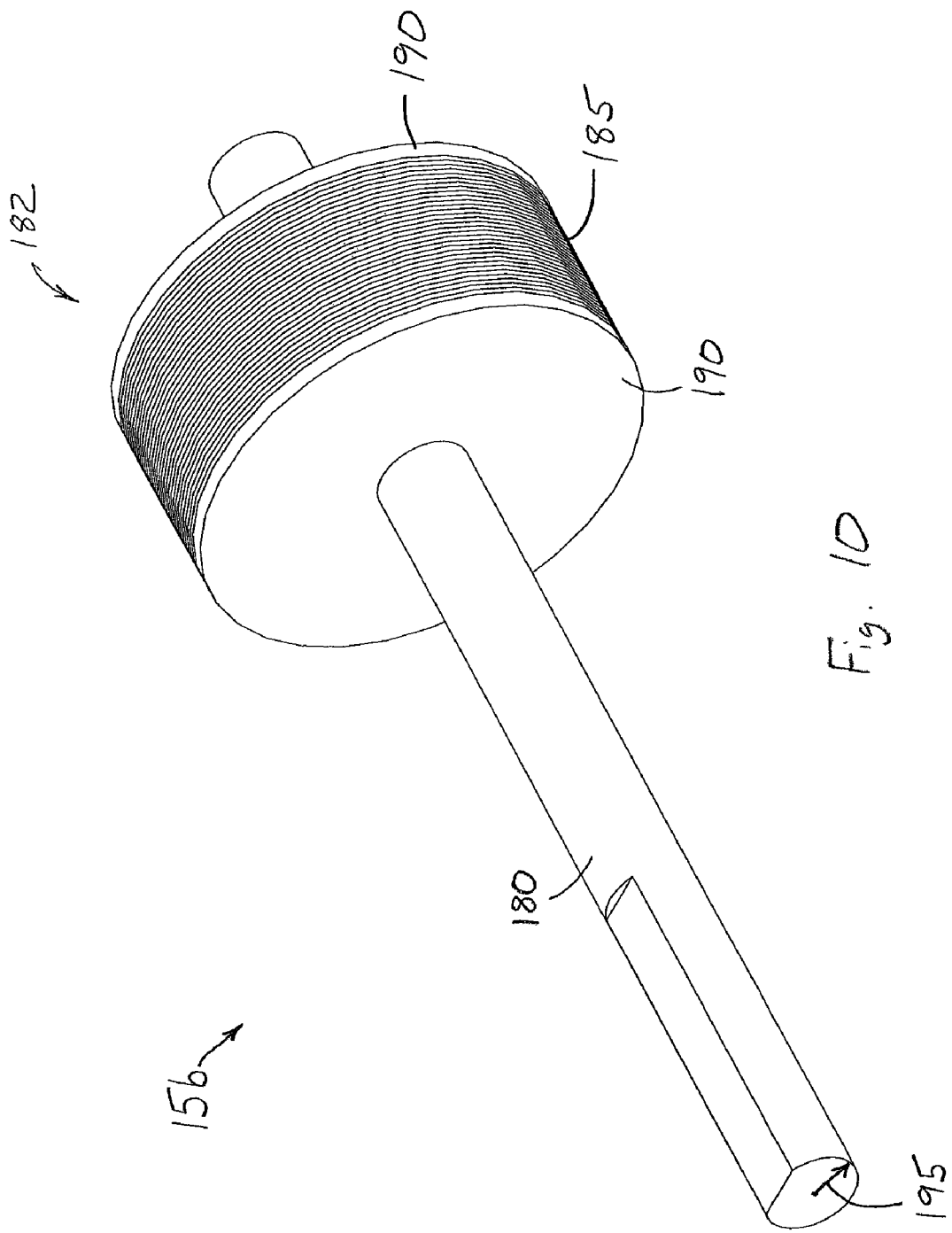
FIG. 10 is a perspective view of a rotor core and shaft subassembly suitable for use in the motor of FIG. 1.
Figure 11:
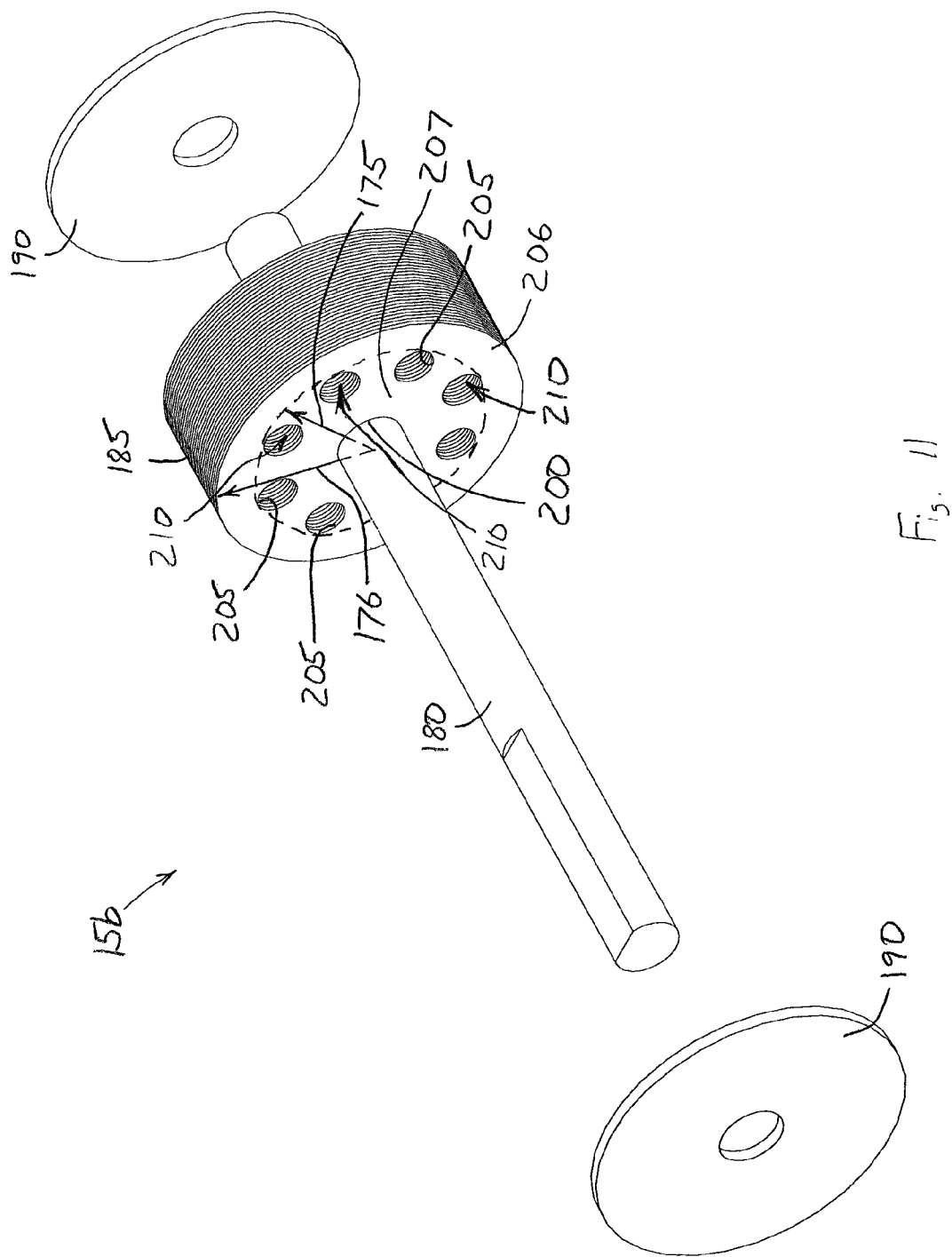
FIG. 11 is a partially exploded view of the rotor core and shaft subassembly of FIG. 10.

FIGS. 10 and 11 illustrate another construction of a rotor 156 that includes a shaft 180, and a rotor core 182 including several first laminations 185, and at least two second laminations 190. The shaft 180 is similar to the shaft 30 of FIGS. 2-7 and includes a core support portion that defines a radius 195. The first laminations 185, better illustrated in FIG. 11, define a central aperture 200 that has a radius that closely matches the shaft radius 195 and a plurality of outer apertures 205 arranged around the central aperture 200 and positioned radially outward. The outer apertures 205 reduce the weight of the rotor 156, thereby reducing mechanical losses during operation. A plurality of first laminations 185 are stacked to define a large portion of the rotor core 182. In some constructions, the outer apertures 205 align with one another to define cylindrical spaces 210 that extend the length of the stacked laminations. In the preferred constructions, the outer apertures 205 are placed closer to the shaft within the calculated diameter, which is equal to twice the radius 175, in order to ensure a minimum back iron radial thickness that is substantially equal to the value calculated with the aforementioned equation.

Thus, the rotor core portion 182 illustrated in FIG. 11 includes a first portion 206 that has a first (volumetric mass) density and a second portion 207 that has a second density. Each lamination 185 includes an outer portion and an inner portion that cooperate to define the first portion 206 and the second portion 207 respectively. In preferred constructions, the first portion 206 includes a ferromagnetic material that has a density that is substantially equal to the density of the first portion 206. In other words, the first portion 206 includes solid ferromagnetic material with few, if any, apertures passing therethrough. The second portion 207 also includes ferromagnetic material. However, the outer apertures 205 that pass through the second portion 207 significantly reduce the density of the second portion 207 when compared to the density of the ferromagnetic material. In preferred constructions, the second density is at least 20 percent less than the density of the ferromagnetic material. When arranged as illustrated in FIG. 11, the effect of the outer apertures 205 on the rotor magnetic field and motor performance is greatly reduced.

Each of the second laminations 190 is positioned on one end of the stack to cover the outer apertures 205. The second lamination 190 covers the open ends of the cylindrical spaces 210 and reduces windage losses that would typically occur if the cylindrical spaces 210 had remained uncovered. In other constructions, in which the use of the end laminations 190 is optional, the apertures 205 are filled with a light-weight material such as plastic to reduce the windage losses without significantly increasing the weight of the rotor core and shaft subassembly 15b.

Figure 12:
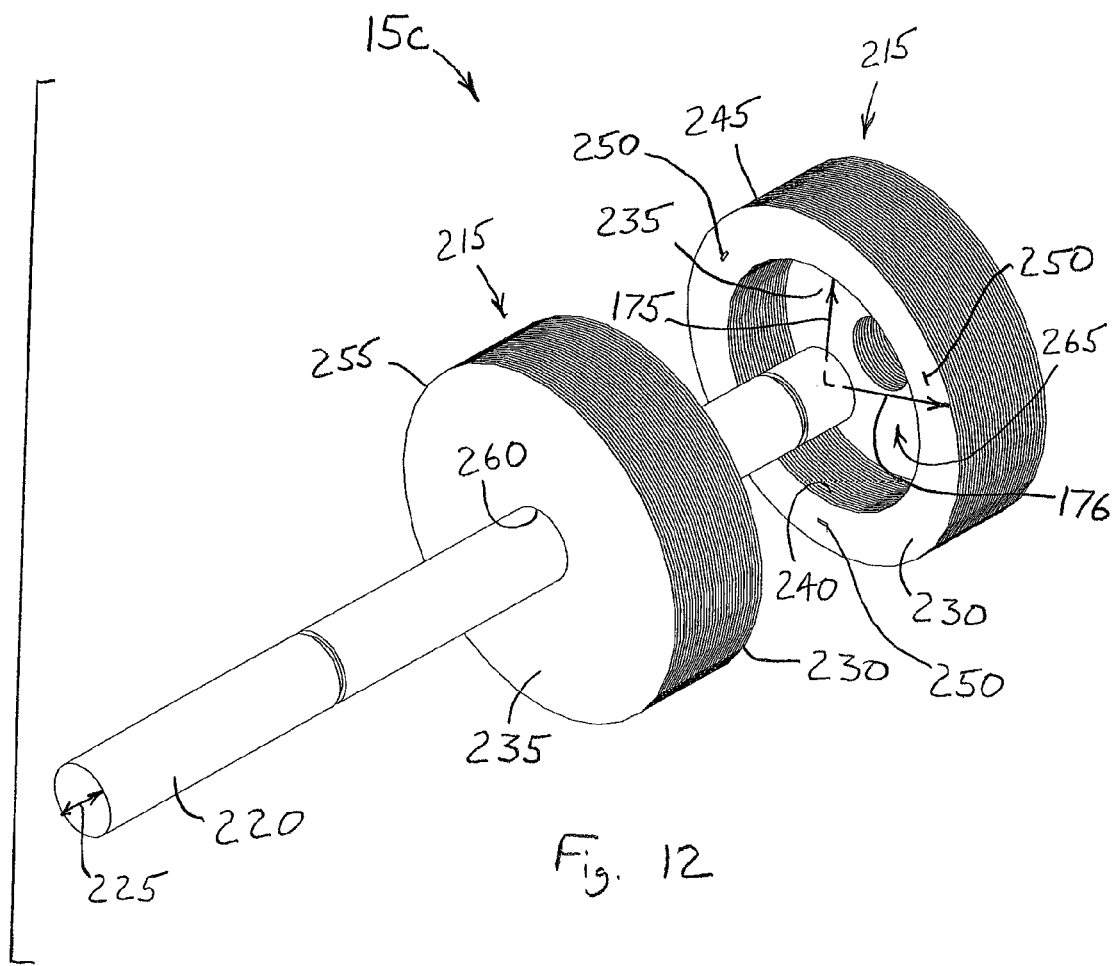
FIG. 12 is a partially exploded view of another rotor core and shaft subassembly suitable for use in the motor of FIG. 1.
Figure 13:
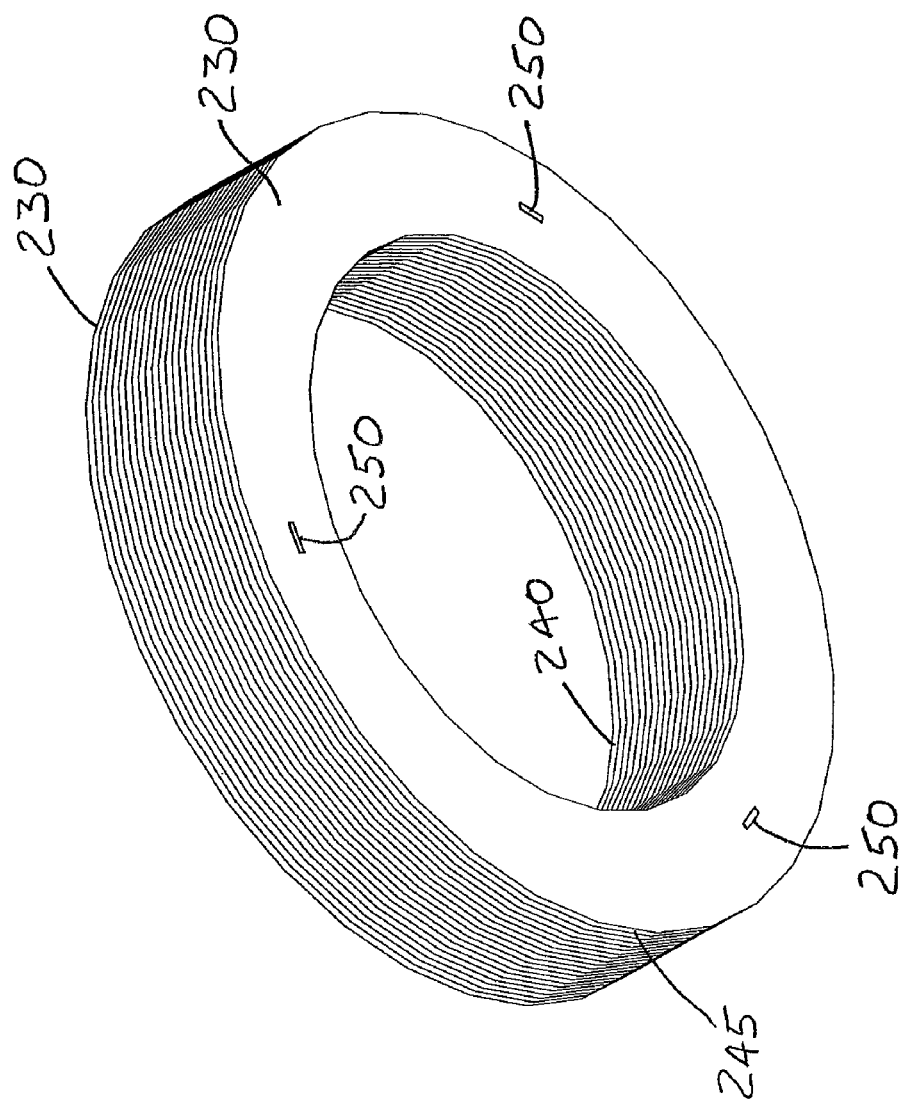
FIG. 13 is a perspective view of an annular portion of the rotor core and shaft subassembly of FIG. 12.

FIGS. 12-15 illustrate another construction of a rotor core and shaft subassembly 15c that includes two rotor core portions 215 formed using laminations. The rotor core and shaft subassembly 15c includes a shaft 220 having a diameter 225, a plurality of first laminations 230, and a plurality of second laminations 235. The first laminations 230, several of which are illustrated in FIG. 13, are substantially annular rings that define an inside diameter 240 and an outside diameter 245. Each first lamination 230 includes several lances 250 or indentations that define a pocket on one side of the lamination 230 and a protrusion on the other side of the lamination 230. The protrusions of one lamination 230 fit within the depressions of the adjacent lamination 230 to align the laminations 230 as desired. Lances 250 of this type or other similar types could be employed with any laminations discussed herein.

Figure 14:
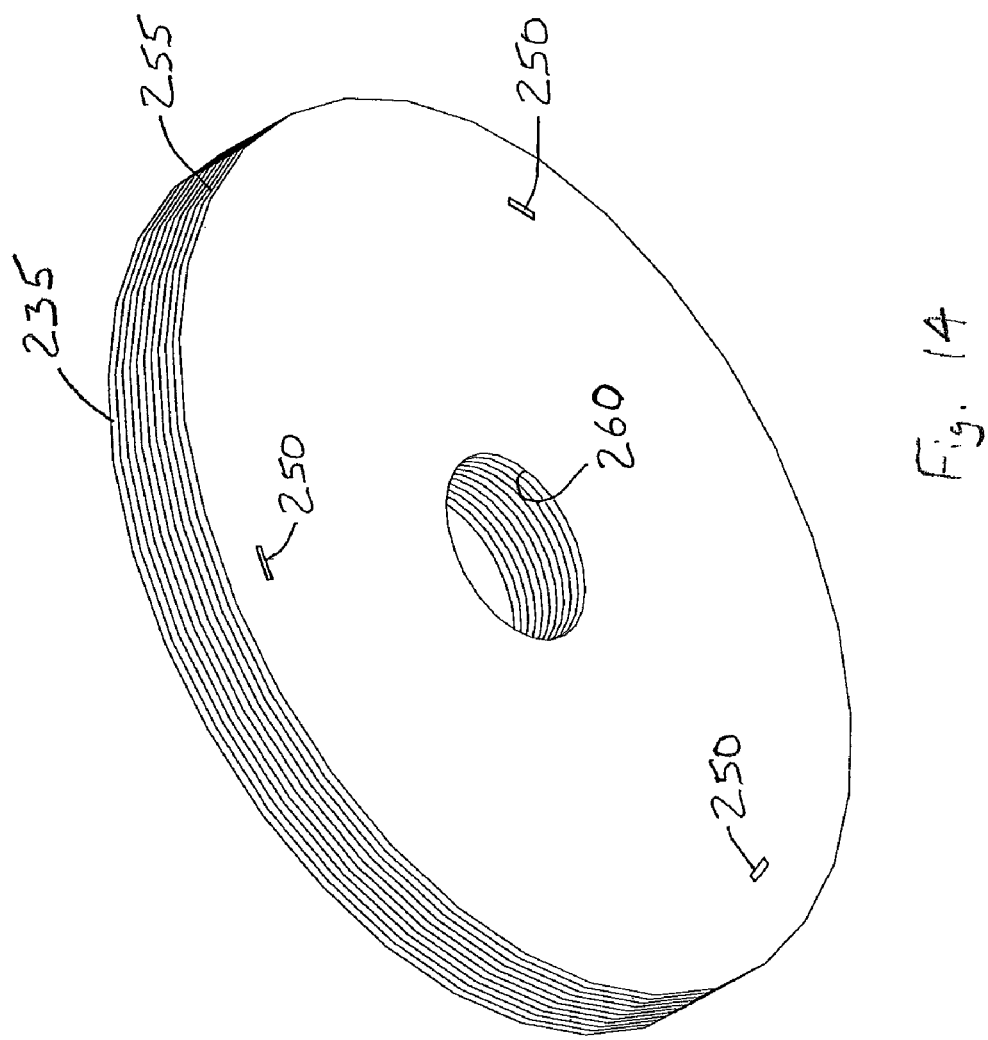
FIG. 14 is a perspective view of an end portion of the rotor core and shaft subassembly of FIG. 12.

The second laminations 235, several of which are illustrated in FIG. 14, define an outside diameter 255 that substantially matches the outside diameter 245 of the first laminations 230 and an inside diameter 260 that substantially matches the shaft diameter 225. Each of the second laminations 235 also includes lances 250 that correspond with, and are engageable with, the lances 250 of the first laminations 230. Thus, the second laminations 235 can abut and align with the first laminations 230.

Figure 15:
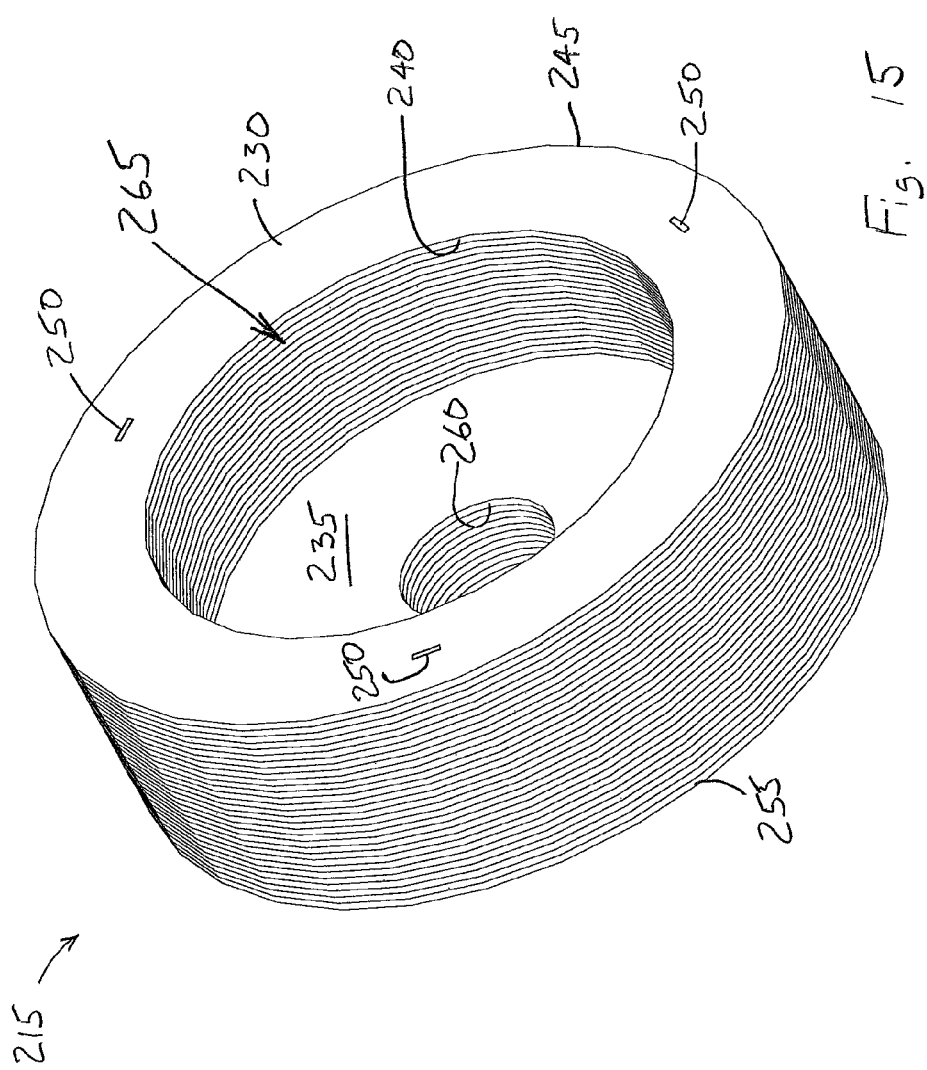
FIG. 15 is a perspective view of a core portion of the rotor core and shaft subassembly of FIG. 12.
Figure 16:
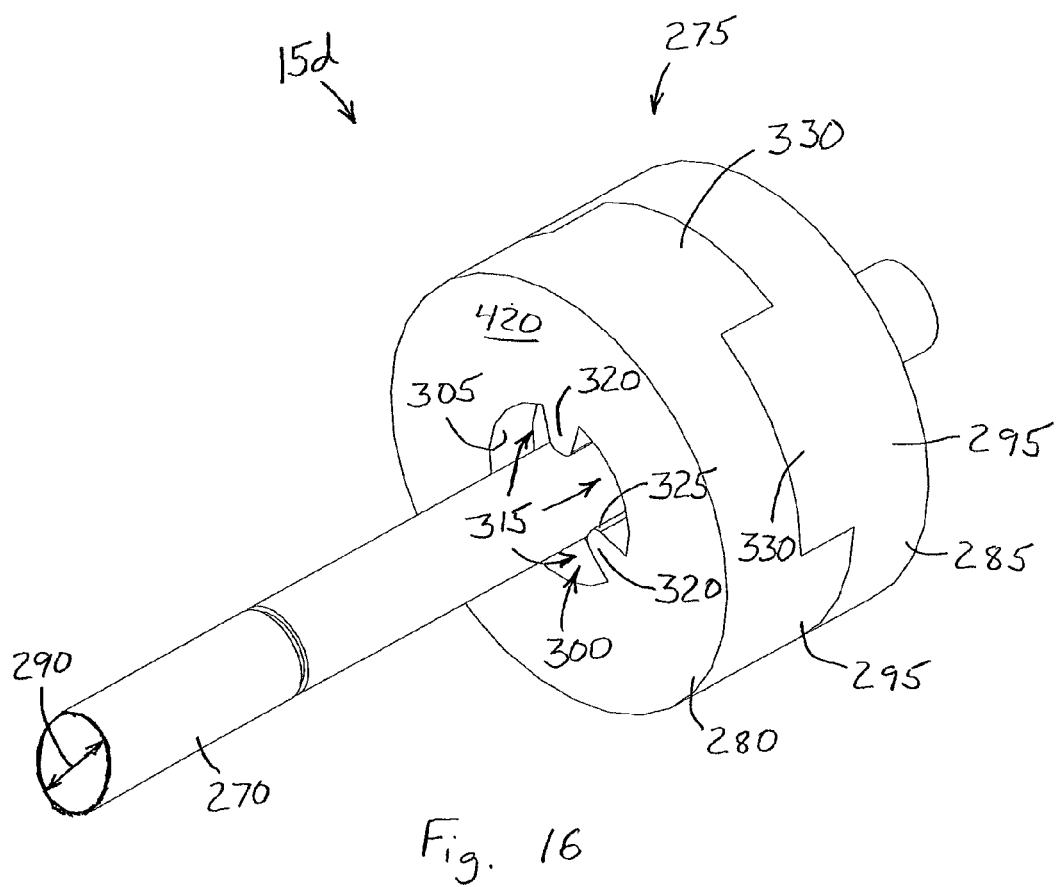
FIG. 16 is a perspective view of another rotor core and shaft subassembly suitable for use in the motor of FIG. 1.

Turning to FIG. 15, one of the rotor core portions 215 is illustrated. The core portion 215 includes several first laminations 230 positioned adjacent one another to at least partially define an internal space 265. Several second laminations 235 are then positioned adjacent the first laminations 230. The second core portion 215 is similar to the first core portion 215 and is positioned adjacent the first core portion 215 to completely define the internal space 265. The second laminations 235 are positioned on either end of the internal space 265 and closely engage the shaft 220 to attach the core portions 215 to the shaft 220, as shown in FIG. 12. In preferred constructions, the laminations 230, 235 interlock to maintain their position and alignment. In some constructions, the internal space 265 is filled with a lightweight material such as plastic. The rotor of FIG. 12 is lightweight, thus reducing the motor's mechanical losses, and yet provides enough material (i.e., back iron) to conduct the magnetic flux as desired. In addition, the positioning of the second laminations 235 on the outer ends of the rotor core, rather than near the center, increases the stability and rigidity of the rotor core and shaft subassembly 15c during operation and reduces windage losses.

Before proceeding, it should be noted that all of the constructions described herein may include fasteners or other attachment systems (e.g., adhesive, welding, etc.) to hold the various laminations together. These systems can be permanent (e.g., adhesive, welding, etc.), or can be temporary. For example, one construction uses bolts that extend the length of the rotor core and hold the various laminations together. The bolt may be a permanent part of the motor or may be removed after magnets are attached to the rotor core. In other constructions, two or more laminated rotor sections, can be produced using a multiple stage punching (stamping) and interlocking (fastening) tool. For example, in the construction shown in FIG. 15, lances 250 are used to align and fasten several laminations 230, 235 as well as the two core sections produced with laminations 230 and 235, respectively, resulting a solid and rigid core portion 215. As such, the invention should not be limited to rotors that include only the features illustrated herein.

FIGS. 16-28 illustrate various constructions of rotors 15 that are manufactured from solid components rather then stacked laminations. The solid portions could be manufactured using, among other things, cast metallic elements, machined components, and/or powdered metal components. Powdered metal components, if employed, are formed by compressing a ferromagnetic powder or a soft magnetic composite in a mold that is shaped to define the final component. After the part is compressed, it may require a sintering step to complete the part. In still other constructions, final machining of the part may be required to add features and/or meet the required tolerances of the final part. The use of powdered metal to form rotor components has several advantageous over other manufacturing techniques. For example, intricate shapes can be formed in a single process without the need for expensive machining. In addition, the use of powdered metal allows for various compounds to be combined that otherwise could not be combined as an alloy. This property allows for greater control over the material properties of the finished parts. Also, the amount of scrap material for rotor fabrication is greatly reduced.

FIGS. 16-19 illustrate a rotor core and shaft subassembly 15*d* that includes a shaft 270 and a rotor core 275 attached to the shaft 270 and including a first solid portion 280, and a second solid portion 285. The shaft 270 is a substantially cylindrical component that defines a shaft diameter 290. While the illustrated shaft 270 includes a substantially uniform diameter portion in the region where the rotor core 275 attaches to the shaft 270, other constructions may include a shaft 270 that includes portions with larger or smaller diameters in the region adjacent the rotor core 275. In fact, any construction discussed herein may include a shaft that includes portions with larger or smaller diameter portions in the region adjacent the rotor core.

Figure 17:
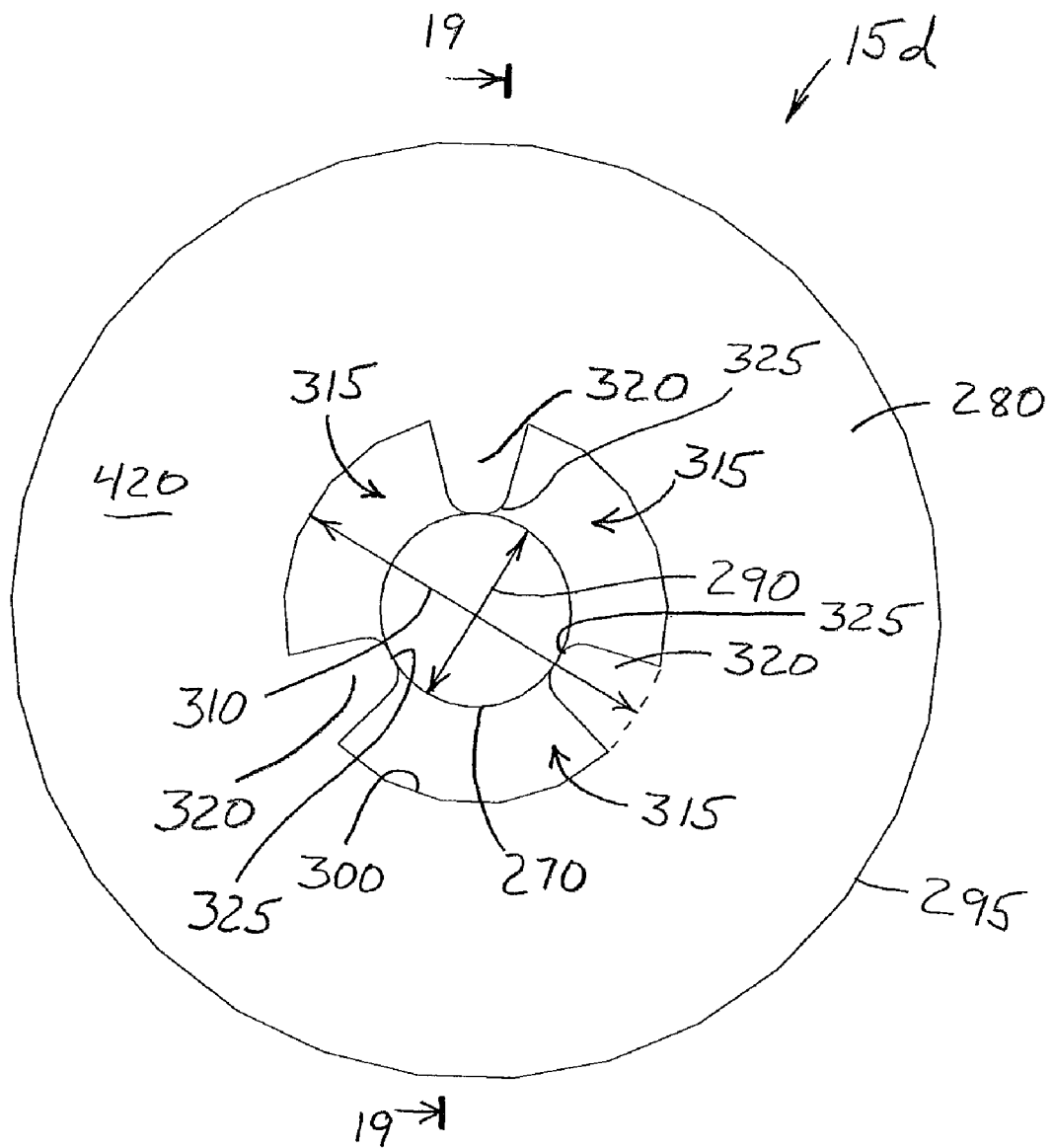
FIG. 17 is an end view of the rotor core and shaft subassembly of FIG. 16.

Each of the solid portions 280, 285 defines an outside surface 295 and an inside aperture 300. The inside aperture 300 defines an inner surface 305 having a diameter 310 that is larger than the shaft diameter 290 such that when positioned adjacent one another, the shaft 270 and each of the solid portions 280, 285 cooperate to define a space 315 therebetween. From an electromagnetic point of view, the diameter 310 is selected such that the rotor back iron is equal to, or larger than the value calculated with the aforementioned equation. Furthermore, in the preferred construction, the minimum rotor core back iron in any rotor cross-section substantially equals the value calculated with the aforementioned equation. With reference to FIG. 17, three fingers 320 extend from the inner surface 305 toward the shaft 270 in a substantially radial direction.

The fingers 320 include a rounded inner most end 325 that when assembled abuts the shaft 270. The rounded end 325 reduces the amount of material in contact with the shaft 270 after assembly and aids in centrally locating the shaft 270. Because very little surface area contacts the shaft 270, it is easier for that material to yield and move to accommodate and center the shaft 270. Other constructions may employ a different number of fingers 320 or different shaped fingers 320 as desired. However, an odd number of fingers 320 is preferred as this reduces the likelihood of parasitic coupling with the magnetic field harmonics.

Figure 18:
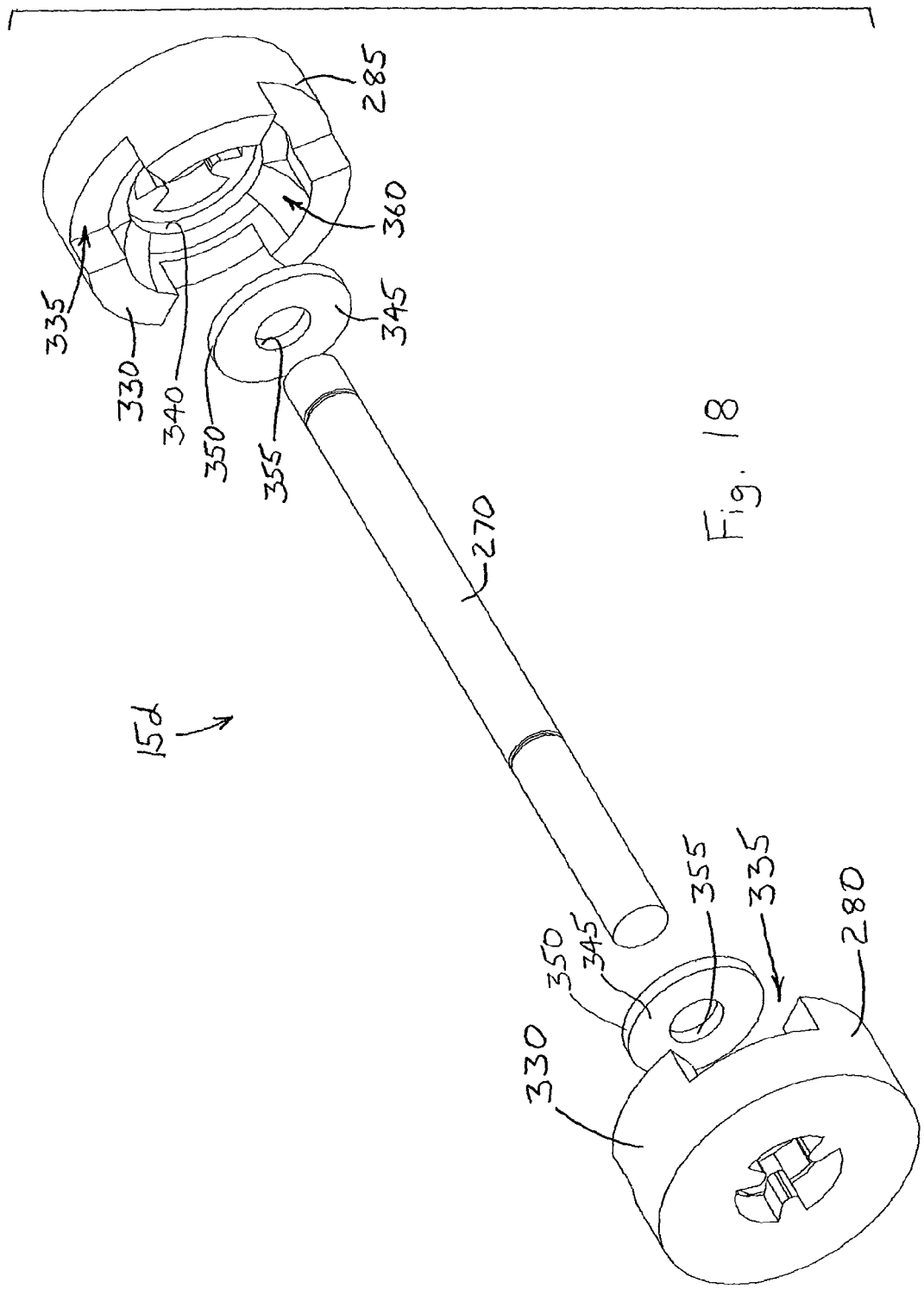
FIG. 18 is an exploded view of the rotor core and shaft subassembly of FIG. 16.

As illustrated in FIG. 18, each solid portion 280, 285 also includes a plurality of teeth 330 positioned adjacent the outside surface 295 and extending axially to define a portion of the outside surface 295. In the illustrated construction, three teeth 330 are spaced apart from one another by about 120 degrees and are sized to define spaces 335 between the adjacent teeth 330 that are about the same size as the teeth 330. The resulting pattern, sometimes referred to as a castellated pattern, allows the two solid portions 280, 285 to interconnect with one another such that they rotate with the shaft 270 in unison. It should be noted that because the first solid portion 280 and the second solid portion 285 are substantially the same (i.e., are interchangeable), the fingers 320 of the second solid portion 285 are rotated with respect to the fingers 320 of the first solid portion 280 by about 60 degrees. Other constructions may employ more or fewer teeth 330 as desired. In addition, different shaped teeth 330 (e.g., triangular semicircular, elliptical, etc.) could be employed if desired. In constructions that employ more or fewer teeth 330 as compared to the quantity of fingers 320, it is possible to arrange the first solid portion 280 and the second solid portion 285 such that the fingers 320 align with one another or are rotated relative to one another at angles other than those discussed herein. In the preferred constructions, the teeth 330 are dimensioned and shaped in order to ensure, when the two solid portions 280 and 285 are mated together, very small or no air-gaps in the rotor core at least over the minimum back iron radial thickness, previously defined and calculated with the aforementioned formula. To enhance the coupling of core portions 280 and 285 an interference or shrink fit is employed for teeth 330.

As shown in FIG. 18, each solid portion 280, 285 includes a cylindrical alignment surface 340 that receives an annular ring 345. The annular ring 345 includes an outer surface 350 that closely fits within the alignment surface 340 and an inner surface 355 that closely fits the shaft 270.

Figure 19:
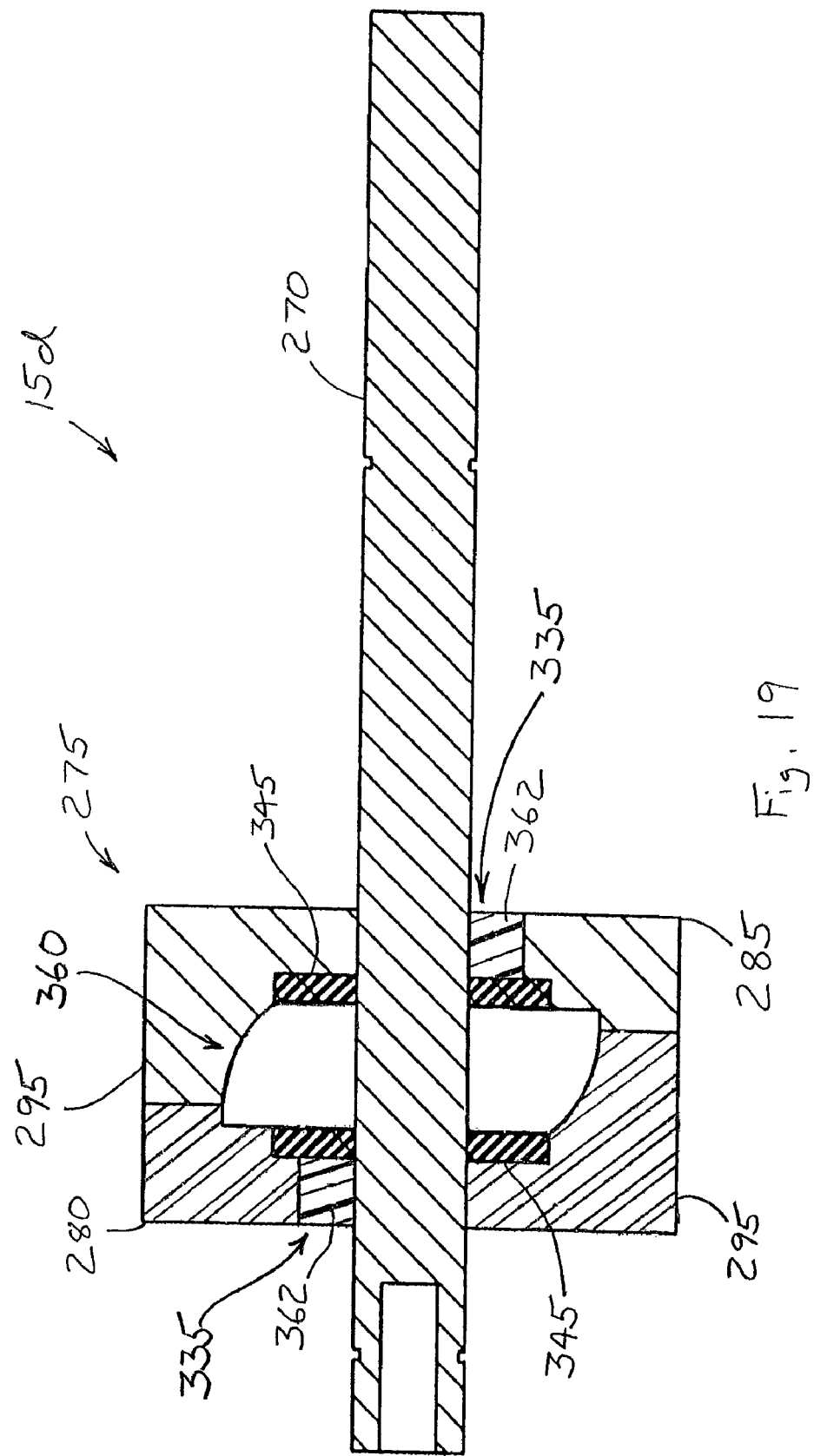
FIG. 19 is a sectional view of the rotor core and shaft subassembly of FIG. 16 taken along line 19-19 of FIG. 17.
Figure 20:
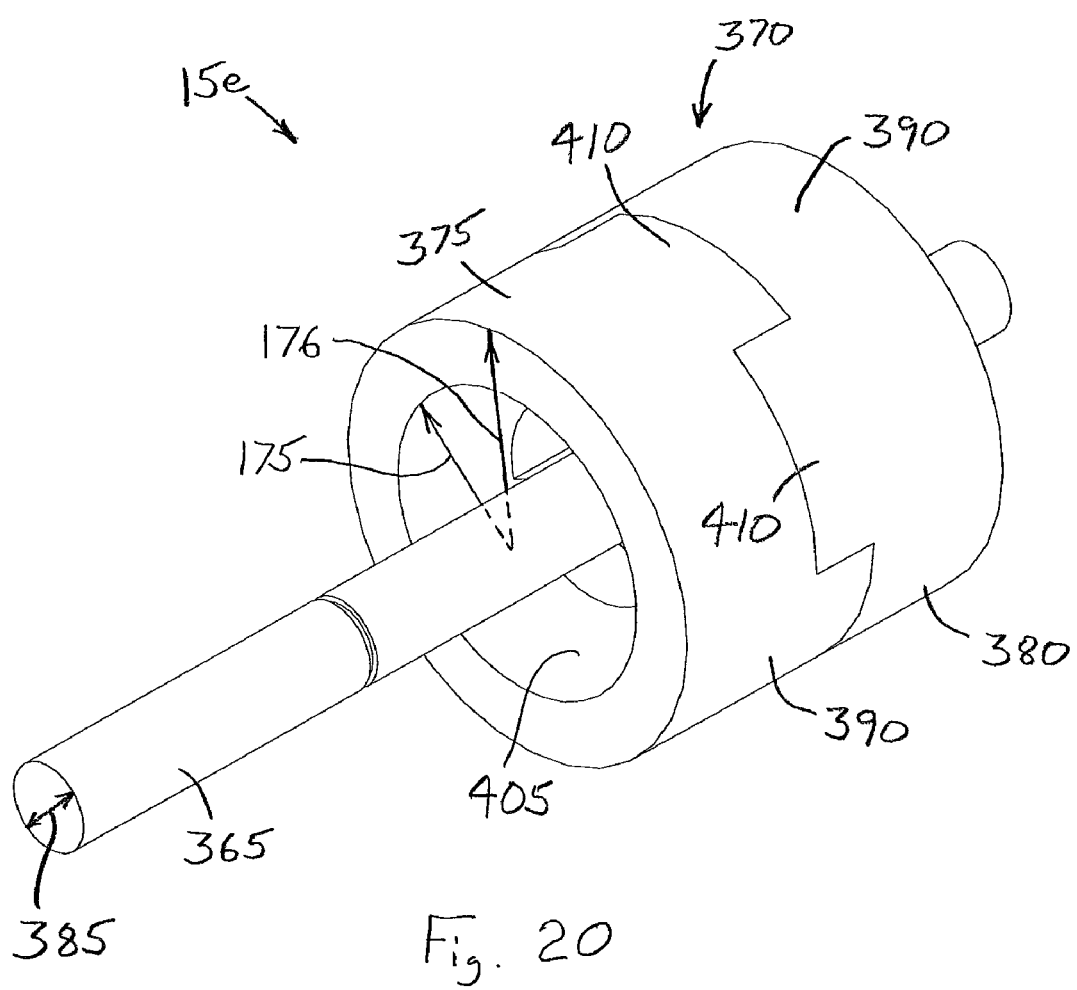
FIG. 20 is a perspective view of another rotor core and shaft subassembly suitable for use in the motor of FIG. 1.

To assemble the rotor of FIGS. 16-19, the annular rings 345 are positioned adjacent the alignment surfaces 340 of the solid portions 280, 285. In some constructions an adhesive or other attachment system is employed to hold the annular rings 345 in place. In still other constructions, a press fit or interference fit between the annular rings 345 and the solid portions 280, 285 holds the annular rings 345 in place. The solid portions 280, 285 slide onto the shaft 270 and are positioned as desired. As shown in FIG. 19, the two solid portions 280, 285 cooperate to define a hollow inner space 360 between the two solid portions 280, 285, with the annular rings 345 substantially sealing this space 360. Resilient material 362 such as plastic or another material is injection molded into the spaces 335 to attach the solid portions 280, 285 to the shaft 270. In some constructions, plastic 362 is also injected into the hollow space 360 between the first solid portion 280 and the second solid portion 285. After the plastic 362 (or other resilient material) has cured, magnets are attached to the outer surface 295 of the solid portions 280, 285, or inserted in the interior of the core to complete the rotor core and shaft subassembly 15*d*. Electric motors, such as for example electrically commutated brushless PM machines often produce an uneven torque that may cause unwanted vibrations at the device being driven by the motor. Because the fingers 320 have only minimal surface contact with the shaft 270, the torque is transmitted through the body of resilient material 362, which reduces the transmission of torque ripple and vibrations between the core 275 and the shaft 270.

FIGS. 20-24 illustrate another construction of a rotor core and shaft subassembly 15*e* that includes a shaft 365 and a rotor core 370 made-up of a first core portion 375 and a second core portion 380. As with prior constructions, the shaft 365 is substantially cylindrical and defines a shaft diameter 385. As with other constructions, the shaft 365 may include different diameter portions (i.e., larger and/or smaller) as may be required by the particular application.

Figure 22:
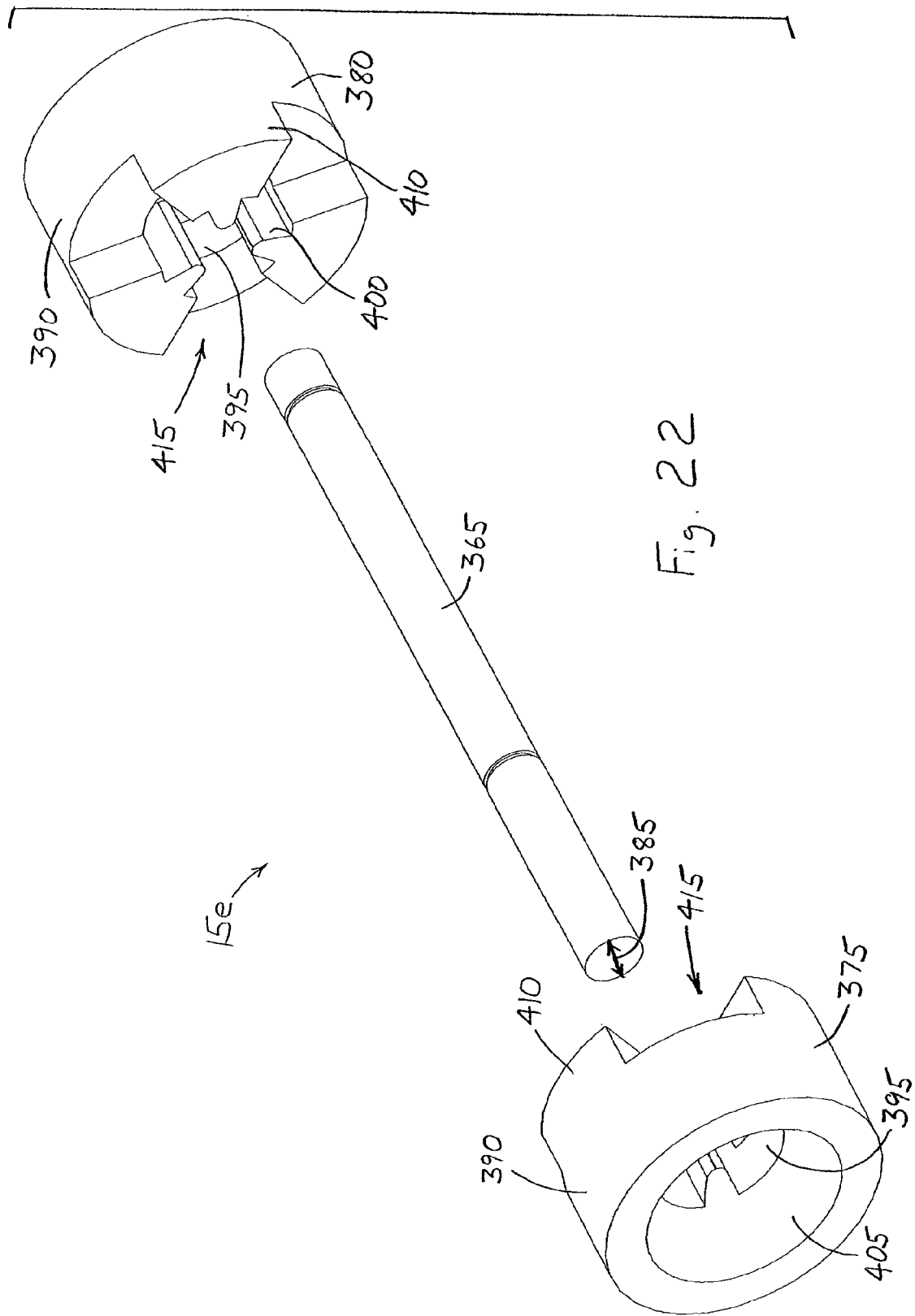
FIG. 22 is an exploded view of the rotor core and shaft subassembly of FIG. 20.
Figure 23:
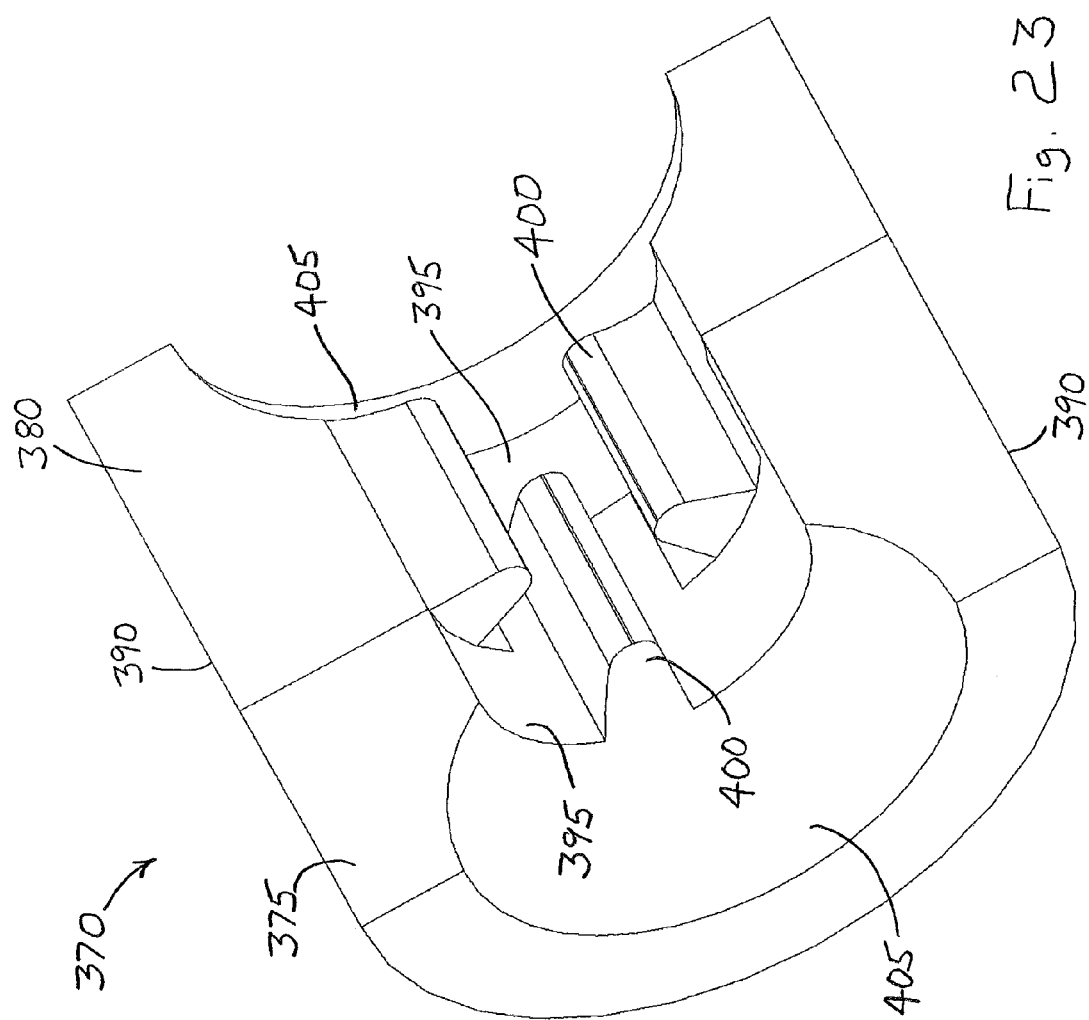
FIG. 23 is a perspective sectional view of the rotor core and shaft subassembly of FIG. 20 with the shaft removed and taken along the longitudinal axis of the shaft.
Figure 24:
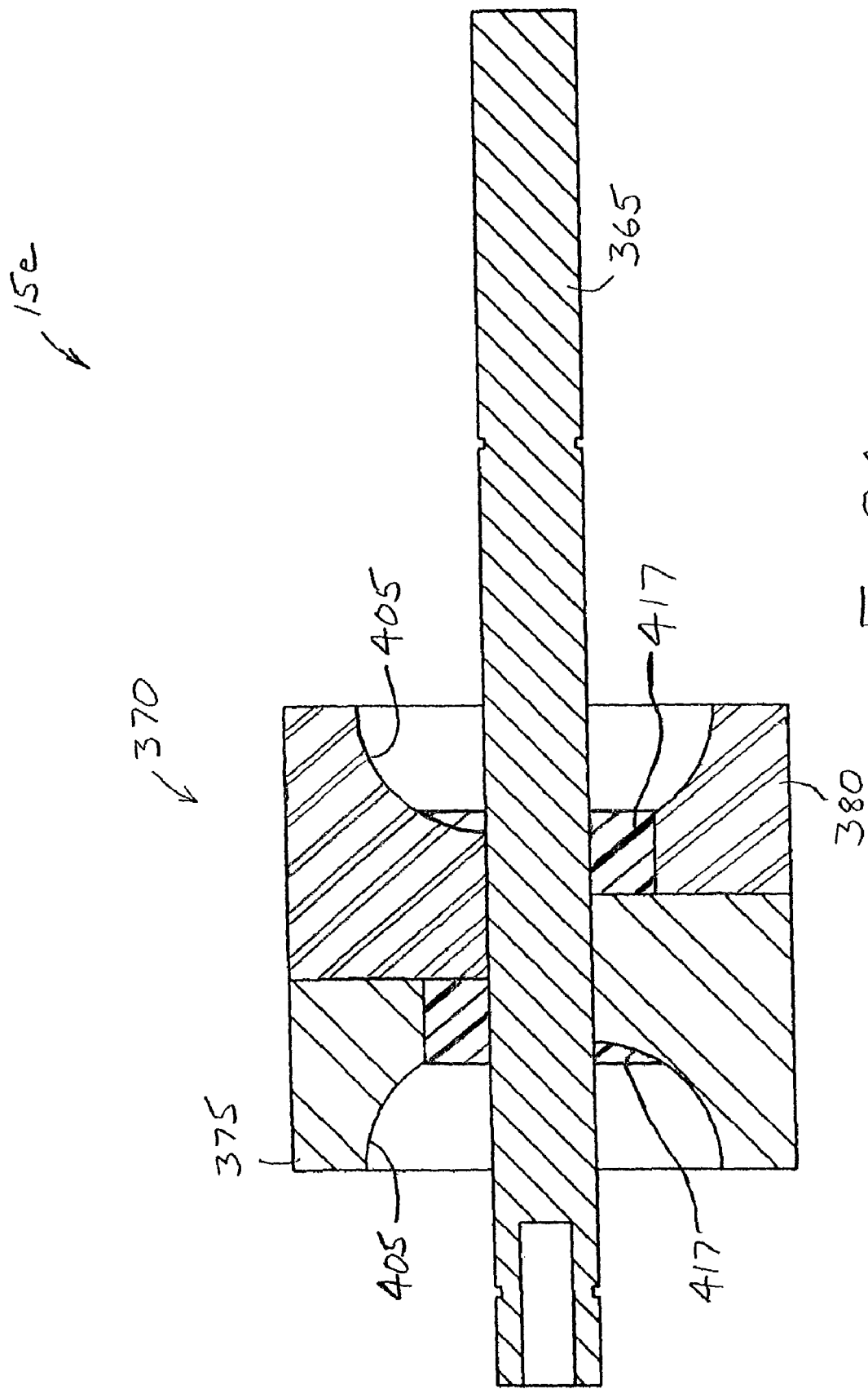
FIG. 24 is a sectional view of the rotor core and shaft subassembly of FIG. 20 taken along line 24-24 of FIG. 21.

Each of the core portions 375, 380 defines an outer surface 390 having an outer diameter and an inner surface 395 having an inner diameter. As shown in FIG. 22, three fingers 400 extend radially inward from the inner surface 395 such that each finger 400 contacts the shaft 365 when the core portions 375, 380 are positioned on the shaft 365. As with prior constructions, more or fewer fingers 400 or differently shaped fingers 400 could be employed if desired. Each core portion 375, 380 also includes a contoured inner surface 405 that extends from the inner surface 395 in a first axial direction and three teeth 410 that extend axially in the opposite direction along the outer surface 390. The contoured surface 405 reduces the weight of the rotor core portions 375, 380 and enhances the torque transmission from the surface to the inner part of the rotor core 370 and the shaft 365.

Figure 21:
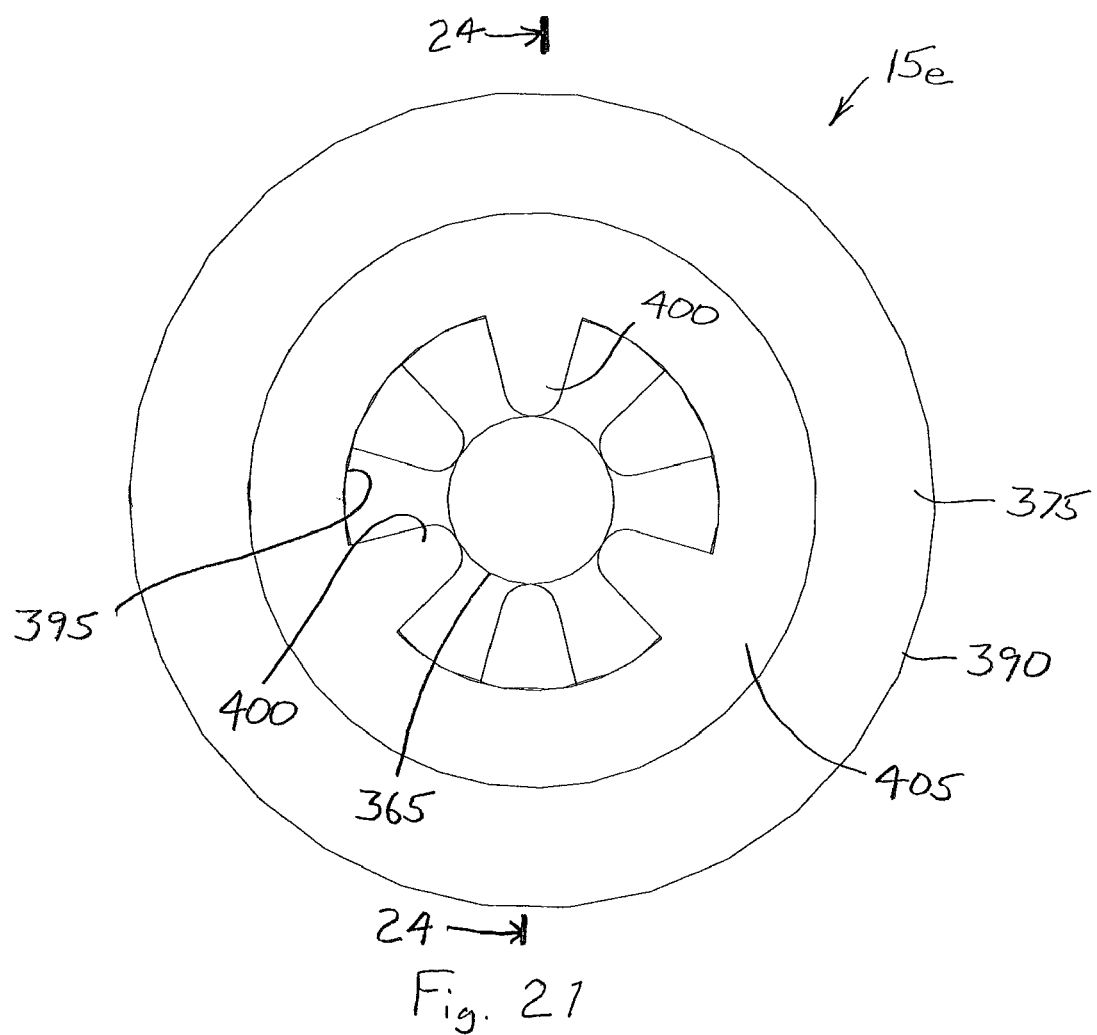
FIG. 21 is an end view of the rotor core and shaft subassembly of FIG. 20.

As illustrated in FIG. 22, the three teeth 410 align with the fingers 400 such that the fingers 400 extend the length of the teeth 410. As with the construction of FIGS. 16-19, the teeth 410 are spaced approximately 120 degrees apart and are sized to define a gap 415 between adjacent teeth 410 that is sized to receive a tooth 410, of a mating core portion. Thus, the teeth 410 of the first core portion 375 fit within the gaps 415 of the second core portion 380 and the teeth 410 of the second core portion 380 fit within the gaps 415 of the first core portion 375 to couple the first and second core portions 375, 380 for rotation. In preferred constructions, the first core portion 375 and the second core portion 380 are similar to one another such that they are interchangeable. Thus, as shown in FIG. 21, when the first core portion 375 and the second core portion 380 are interlocked, the fingers 400 of the second core portion 380 are rotated about 60 degrees with respect to the fingers 400 of the first core portion 375. In constructions that employ a different number of fingers 400 or a different spacing for the fingers 400, the relative angle between the fingers 400 of the first core portion 375 and the second core portion 380 may be greater then or less then 60 degrees. The core portions 375 and 380, and in particular the fingers 410 together with the surface 405 are designed such that when the two core portions 375 and 380 are mated together, there are very small or no air-gaps in the rotor core at least over the minimum back iron radial thickness, previously defined and calculated with the aforementioned formula. To enhance the coupling of core portions 375 and 380 an interference or shrink fit is employed for teeth 330.

A resilient material 417, such as plastic, is positioned in the space defined between the shaft 365 and the inner surface of the first core portion 375 and the second core portion 380. The resilient material 417, shown in FIG. 24, extends between the teeth 410 such that the resilient material 417 couples the shaft 365, the first core portion 375, and the second core portion 380 for rotation. In some constructions, resilient material 417 is also positioned in the space defined between the contoured inner surface 405 and the shaft 365. Preferably, an injection-molded plastic is employed as the resilient material 417. However, other constructions may employ other materials or other methods to position the material.

The construction of FIGS. 16-19 differs from the construction of FIGS. 20-24 in that a device or means, e.g. the annular ring 345, is required in the construction of FIGS. 16-19 to contain the resilient material between the fingers 320 as it is injected. The construction of FIGS. 20-24 does not require this device as the fingers 400 are positioned near the center of the core 370 rather than at the ends. However, the construction of FIGS. 16-19 is advantageous over the construction of FIGS. 20-24 for other reasons. For example, the solid portions 280, 285 of the construction of FIGS. 16-19 are such that the attachment between the solid portions 280, 285 and the shaft 270 is located near the ends of the core 275, thus enhancing the mechanical properties of the rotor core 275. In addition, the solid portions 280, 285 of FIGS. 16-19 include a substantially large flat or planar surface 420, which can be used to press against during the powder compression process and as a support during the sintering process. To some extent such a flat surface is represented in the construction of FIGS. 20-24 by the flat faces of the teeth 410.

Figure 25:
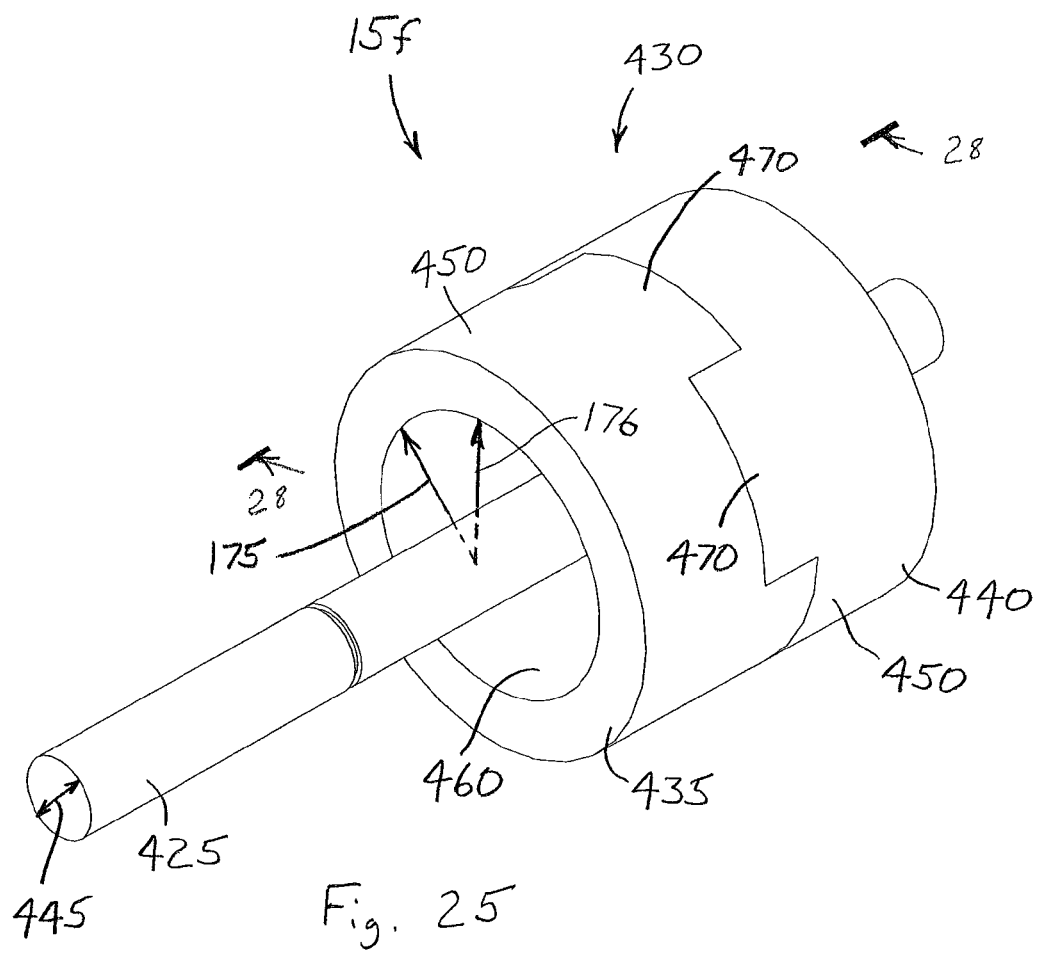
FIG. 25 is a perspective view of another rotor core and shaft subassembly suitable for use in the motor of FIG. 1.
Figure 26:
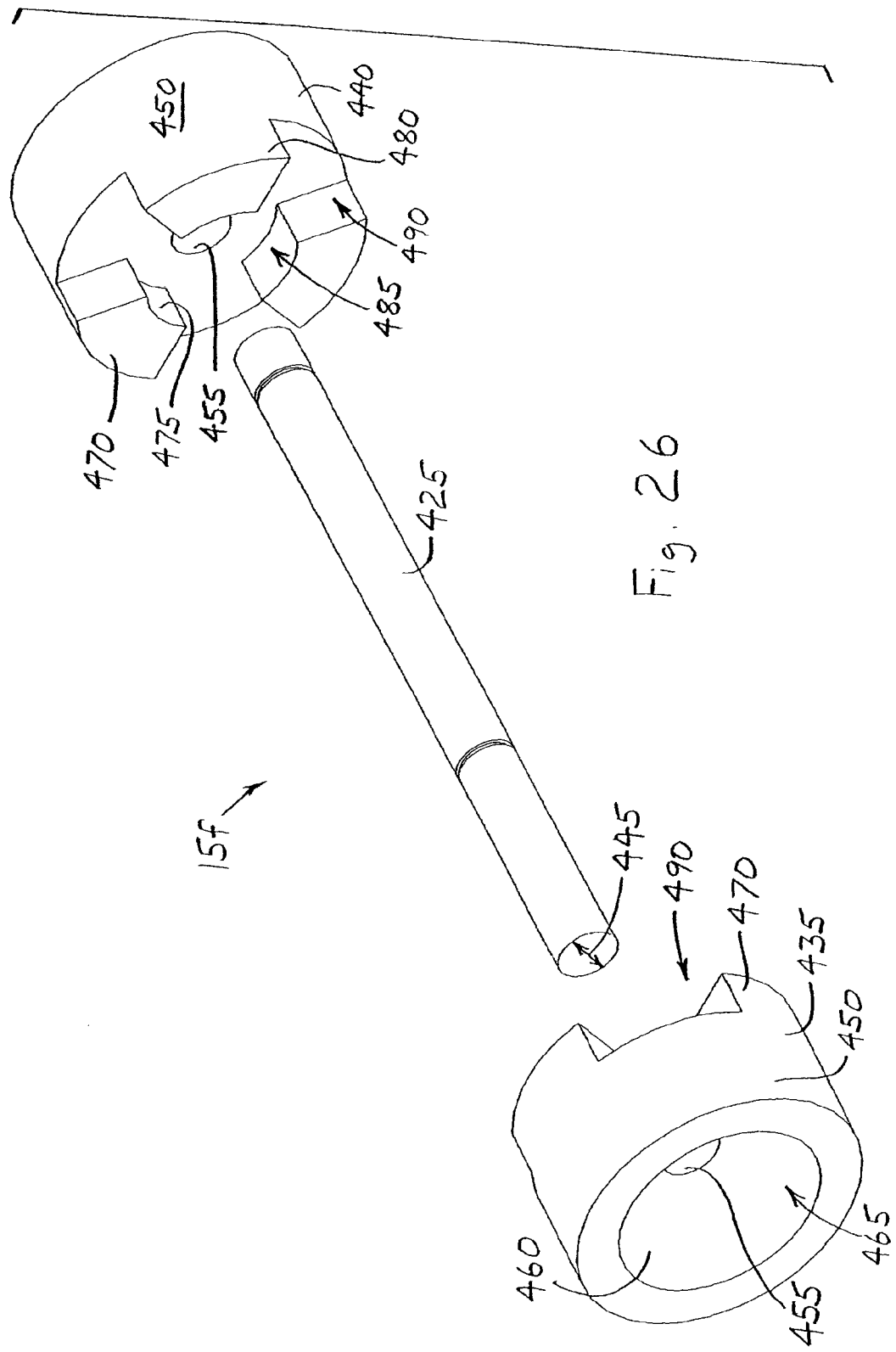
FIG. 26 is an exploded view of the rotor core and shaft subassembly of FIG. 25.
Figure 27:
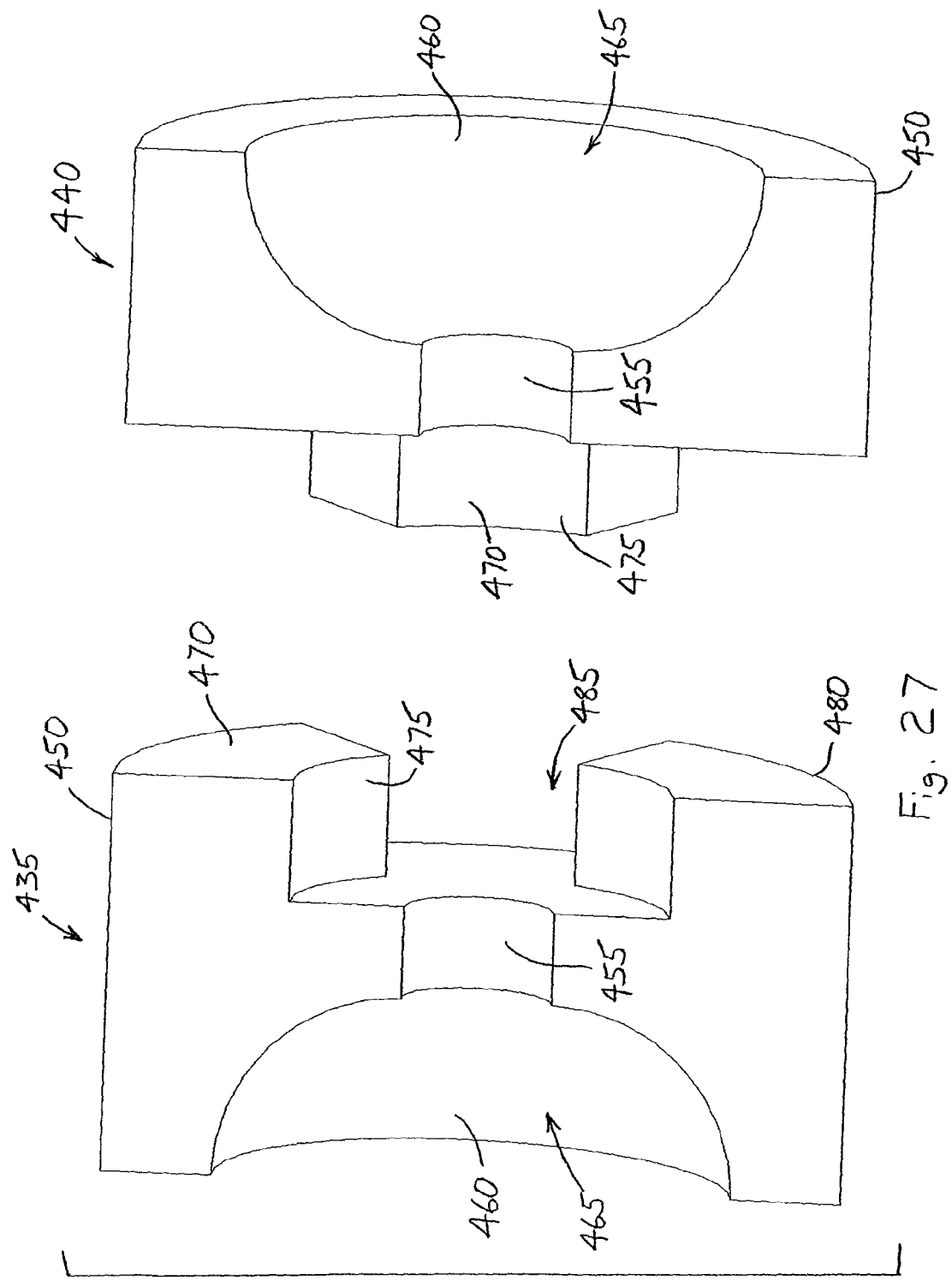
FIG. 27 is an exploded section view of the rotor core and shaft subassembly of FIG. 25 with the shaft removed and taken along the longitudinal axis of the shaft.

FIGS. 25-28 illustrate another construction of a rotor core and shaft subassembly 15f that is similar to the construction of FIGS. 20-24. As shown in FIG. 25, the rotor core and shaft subassembly 15f includes a shaft 425 and a rotor core 430 that includes a first core portion 435 and a second core portion 440. As with prior constructions, the shaft 425 is a generally cylindrical component that defines a shaft diameter 445. In some constructions, the shaft 425 may include larger or smaller diameter portions as desired.

Each of the core portions 435, 440 include an outer surface 450 that defines an outer diameter and an inner surface 455 that defines an inside diameter. The inside diameter closely matches the shaft diameter 445 to align the core portions 435, 440 on the shaft 425. A contoured inner surface 460 extends from the inner surface 455 in a first direction and cooperates with the shaft 425 to define a space 465.

Three teeth 470 extend axially from each of the core portions 435, 440 in substantially the opposite direction as the contoured inner surface 460. Each tooth 470 has a substantially trapezoidal axial cross-section with a cylindrical inner surface 475 and a cylindrical outer surface 480 that is generally coincident with the outer surface 450. The cylindrical inner surface 475 defines a diameter that is larger than the shaft diameter 445. Thus, the cylindrical inner surface 475 and the shaft 425 cooperate to define an interior space 485, as shown in FIG. 28. Each tooth 470 is spaced approximately 120 degrees from the adjacent teeth 470 and cooperates with the adjacent teeth 470 to define a gap 490 sized to receive a tooth 470. As such, the teeth 470 of the first core portion 435 fit within the gaps 490 of the second core portion 440 and the teeth 470 of the second core portion 440 fit within the gaps 490 of the first core portion 435 to interlock the core portions 435, 440. In preferred constructions, the first core portion 435 and the second core portion 440 are substantially the same such that they are interchangeable. However, other constructions may vary the first core portion 435 with respect to the second core portion 440.

In some constructions, a resilient material 495, such as plastic, may be positioned within the interior space 485 to attach the first core portion 435 and the second core portion 440 to the shaft 425 for rotation. In addition, the resilient material 495 may be positioned in the space between the contoured inner surfaces 460 and the shaft 425. Preferably, an injection-molded plastic is employed as the resilient material 495. However, other constructions may employ other materials or other methods to position the material. It should be noted that the resilient material 495 as used in the construction of FIGS. 25-28 does not provide significant damping. Thus, reduced cogging, torque ripple, noise and vibration for this construction must be achieved using other methods, such as skewed magnets.

The constructions previously described are especially suited for motors with relatively thin back iron, such as high pole count motors. The constructions are also suitable for motors for which the performance is less influenced by the value of the rotor magnetic permeance and that have a relatively low specific torque output per unit length, such as, for example, brushless permanent magnet machines with ferrite magnets mounted on the outer surfaces of the rotor.

As with all of the constructions discussed herein, permanent magnets can be attached to the outer surface of the rotor cores or inserted in the rotor cores to complete the rotor assembly. It should be noted that the present invention could be employed with other types of motors or generators. For example, the present invention could be applied to interior permanent magnet motors as well as squirrel cage motors. In addition, the present invention could be applied to inside-out motors if desired.

FIGS. 8 and 9 illustrate a rotor construction that includes magnets 183 attached to the surface of a rotor core. The magnets 183 are arranged to define alternating north and south poles around the outer circumference of the magnets 183. Each of the poles thus defines two inter-pole axes 500, each disposed between the respective pole and the adjacent pole, and a center pole axis 505 that passes through a magnetic center of the pole. In constructions in which each magnet 183 defines a single pole (i.e., either north or south), the center pole axis 505 passes through the approximate center of the magnet 183 and the inter-pole axes 500 substantially coincide with the physical radial edges of the magnet 183 in the motor cross-section. However, constructions that employ fewer magnets 183 magnetize each magnet 183 to include multiple poles. In these constructions, the inter-pole axes 500 and the center-pole axes are defined with respect of the magnetic flux pattern rather than to the mechanical dimensions of the magnets.

FIGS. 29 and 30 illustrate one arrangement of magnets 183 on the rotor core 430 of FIGS. 25-28. In this construction, each magnet 183 defines a single pole. As such, the inter-pole axes 500 pass between adjacent magnets 183 and the center pole axes 505 pass substantially through the center of each magnet 183. With reference to FIG. 29, it can be seen that the magnets 183 are arranged such that one of the center pole axes 505 is substantially aligned with an axial portion 510 of a seam 515 between the first core portion 435 and the second core portion 440.

Figure 31:
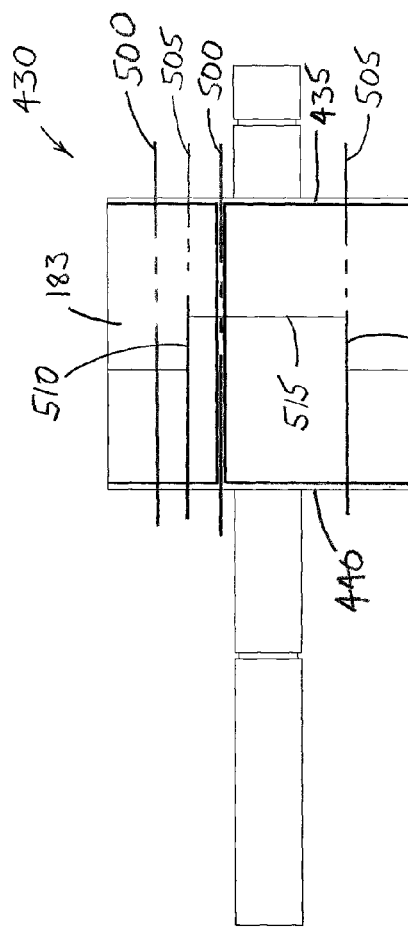
FIG. 31 is top view of the rotor core of FIG. 25 showing a second magnet arrangement.
Figure 32:
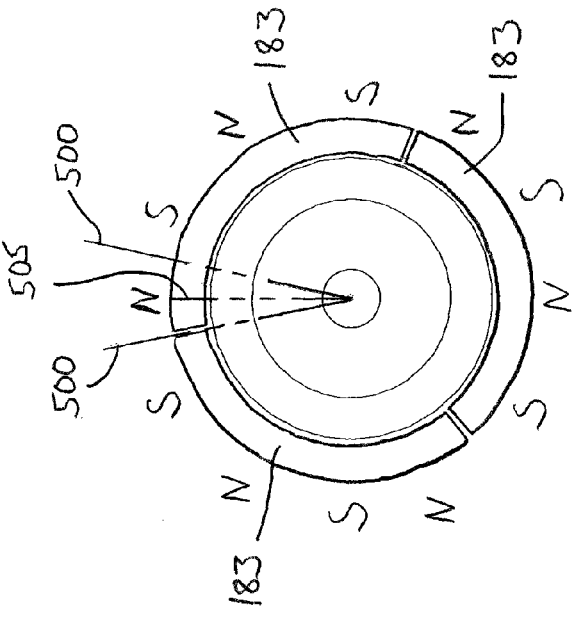
FIG. 32 is an end view of the rotor core of FIG. 25 showing the second magnet arrangement of FIG. 31.

FIGS. 31 and 32 illustrate another arrangement of magnets 183 on the rotor core 430 of FIGS. 25-28. In this construction, each magnet 183 defines a plurality of poles. Specifically, this example includes four poles per magnet and three magnets. Thus, the rotor includes twelve magnetic poles in total. In this example, at least some of the inter-pole axes 500 do not align with the physical separation between two adjacent magnets 183. With reference to FIG. 31, in a preferred construction, the magnets 183 are arranged on the outer diameter of the rotor core 430 such that one of the center pole axes 505 aligns with each of the axial portions 510 of the seams 515 between the first core portion 435 and the second core portion 440. Because the center pole axes 505 are based on magnetic flux, the magnets 183 are positioned based on a dimension determined in the design phase. This dimension (e.g., distance from an edge) allows the magnet 183 to be properly positioned during assembly.

Thus, the arrangement of the magnets 183 in both the construction of FIGS. 29 and 30 and the construction of FIGS. 31 and 32 positions the magnets 183 such that each of the axial portions 510 of the seams 515 aligns with a different one of the center pole axes 505. This arrangement minimizes the effect of the seams 515, and of any residual air-gaps associated with them, on the magnetic flux of the motor and improves motor operation. The rotor constructions of the invention reduce the torque ripple, noise, and force vibrations, that prior art rotors transmit. Specifically, the use of resilient material between the rotor core and rotor shaft at least partially isolates the two components such that noise, torque ripple, or force vibrations applied to the core are at least partially damped by the resilient material, rather than being transmitted to the rotor shaft.

In addition, the shape of the laminations or solid core portions greatly increase the concentricity of the shaft to rotor core over that of the prior art. The improved concentricity reduces the need for balancing and reduces the vibrations caused by rotor mechanical imbalance and unbalanced magnetic forces.

Furthermore, many of the constructions illustrated herein include a reduced back iron portion. The reduction in back iron reduces the weight of the rotor and reduces the amount of material required to produce the rotor. The reduction in weight improves the efficiency of the motor and reduces the rotational stress applied to the motor components, while also reducing the material used and the cost of the motor. For example, the constructions of FIGS. 16-28 include large spaces that may or may not be filled with a resilient material. The large spaces reduce the quantity of back iron in the rotor core but do not greatly affect the flow of magnetic flux within the core, as illustrated in FIGS. 8 and 9. The constructions of FIGS. 2-7 and 10-15 similarly include a reduced back iron portion that does not greatly affect the flow of magnetic flux within the core.

Thus, the invention provides, among other things, a new and useful rotor for an electric machine. The constructions of the rotor and the methods of manufacturing the rotor described herein and illustrated in the figures are presented by way of example only and are not intended as a limitation upon the concepts and principles of the invention. Various features and advantages of the invention are set forth in the following claims.

What is claimed is:

1. A rotor for an electric machine having a number of poles, the rotor comprising:
    a shaft extending along a portion of an axis and defining an outer surface;
    a first core portion formed as a single inseparable component and including a first portion that extends from the outer surface at a first axial position to a first outside diameter to define a first thickness, and
    a second portion extending axially from the first portion toward a second axial position and including a reduced back portion extending from an inside diameter to the first outside diameter to define a second thickness that is less than the first thickness, the first core portion defining a first space between the outer surface and a surface of the first core portion that defines the inside diameter, the first core portion including a plurality of fingers that extend radially to directly contact the outer surface and define finger spaces between adjacent fingers where the first core portion does not directly contact the outer surface; and
    second core portion that extends from the outer surface at the second axial position and including a second outside diameter that is substantially the same as the first outside diameter, wherein the first core portion and the second core portion interconnect to define a rotor core having a first end adjacent the first axial position, a second end opposite the first end adjacent the second axial position, and a hollow space including the first space between the first core portion and the second core portion, wherein the interconnection between the first core portion and the second core portion is substantially air-tight without any sealant therebetween.

2. The rotor of claim 1, wherein at least a portion of the second thickness is less than or equal to 125 percent of a calculated thickness defined by the equation calculated thickness =(first outside diameter/2)*(PI/number of poles).

3. The rotor of claim 1, wherein the first core portion is formed from a powdered metal.

4. The rotor of claim 1, further comprising a plurality of magnets that each defines at least one pole and at least one center pole axis, and wherein each of the magnets is attached to at least one of the first outside diameter and the second outside diameter.

5. The rotor of claim 4, wherein the first core portion and the second core portion cooperate to define a seam that includes a portion that is substantially parallel to the axis.

6. The rotor of claim 5, wherein at least one center pole axis is aligned with the portion of the seam that is parallel to the axis.

7. The rotor of claim 4, wherein the first core portion and the second core portion cooperate to define a seam that includes a plurality of axial portions that are substantially parallel to the axis, and wherein each of the axial portions aligns with a different one of the center pole axes.

8. The rotor of claim 1, wherein the second core portion is formed as a single inseparable component and includes a third portion that extends from the outer surface to the second outside diameter to define the first thickness, and a fourth portion spaced axially from the third portion and including a reduced back portion extending from the inside diameter to the second outside diameter to define the second thickness that is less than the first thickness.

9. The rotor of claim 1, wherein the second core portion is substantially the same as the first core portion.

10. The rotor of claim 1, wherein the first core portion includes a first plurality of teeth and the second core portion includes a second plurality of teeth that engage the first plurality of teeth to connect the first core portion and the second core portion for rotation.

11. The rotor of claim 10, wherein the first plurality of teeth includes three axially-extending teeth, and the second plurality of teeth includes three axially-extending teeth.

12. The rotor of claim 1, further comprising a resilient material disposed within the finger spaces between adjacent fingers and operable to couple the shaft, the first core portion and the second core portion for rotation.

13. A rotor for an electric machine having a number of poles, the rotor comprising:
    a shaft extending along a portion of an axis and defining an outer surface;
    a powdered metal core that extends along a portion of the axis from a first end to a second opposite end to define a core length, the powdered metal core including a first portion having a plurality of radially extending fingers that contact the outer surface and define finger spaces where the first portion does not contact the outer surface, the first portion extending from the outer surface adjacent the first end to an outside diameter to define a first thickness, a second portion extending axially from the first portion toward the second end and including a reduced back portion that extends from the outside diameter to an inside diameter to define a second thickness that is less than the first thickness, the first portion and the second portion interconnecting to define a hollow space between the outer surface and a surface that defines the inside diameter, wherein the connection between the first portion and the second portion is substantially air tight without any sealant therebetween; and
    a resilient material disposed between the fingers and in contact with the outer surface to substantially seal the hollow space within the powdered metal core.

14. The rotor of claim 13, wherein at least a portion of the second thickness is less than or equal to 125 percent of a calculated thickness defined by the equation calculated thickness =(outside diameter/26)*(PI/number of poles).

15. The rotor of claim 13, wherein the first core portion is formed as a single inseparable component, and the second core portion is formed as a single inseparable component.

16. The rotor of claim 15, further comprising a plurality of magnets that each defines at least one pole and at least one center pole axis, and wherein each of the magnets is attached to the outside diameter.

17. The rotor of claim 16, wherein the first core portion and the second core portion cooperate to define a seam that includes an axial portion that is substantially parallel to the axis.

18. The rotor of claim 17, wherein at least one center pole axis is aligned with the axial portion of the seam.

19. The rotor of claim 15, wherein the first core portion and the second core portion cooperate to define a seam that includes a plurality of axial portions that are substantially parallel to the axis, and wherein each of the axial portions aligns with a different one of the center pole axes.

20. The rotor of claim 15, wherein the first core portion is substantially the same as the second core portion.

21. The rotor of claim 15, wherein the first core portion includes a first plurality of teeth and the second core portion includes a second plurality of teeth that engage the first plurality of teeth to connect the first core portion and the second core portion for rotation.

22. The rotor of claim 21, wherein the first plurality of teeth includes three axially-extending teeth, and the second plurality of teeth includes three axially-extending teeth.

* * * * *

UNITED STATES PATENT AND TRADEMARK OFFICE
CERTIFICATE OF CORRECTION

PATENT NO. : 8,035,273 B2  
APPLICATION NO. : 11/756898  
DATED : October 11, 2011  
INVENTOR(S) : Dan M. Ionel et al.

Page 1 of 1

It is certified that error appears in the above-identified patent and that said Letters Patent is hereby corrected as shown below:

In claim 14, column 16, line 11, "(outside diameter/26)" should be "(outside diameter/2)".

Signed and Sealed this
Seventeenth Day of April, 2012

David J. Kappos
*Director of the United States Patent and Trademark Office*